US008165880B2

(12) United States Patent
Hetherington et al.

(10) Patent No.: US 8,165,880 B2
(45) Date of Patent: Apr. 24, 2012

(54) SPEECH END-POINTER

(75) Inventors: Phillip A. Hetherington, Port Moody (CA); Mark Fallat, Vancouver (CA)

(73) Assignee: QNX Software Systems Limited, Kanata, Ontario (CA)

( * ) Notice: Subject to any disclaimer, the term of this patent is extended or adjusted under 35 U.S.C. 154(b) by 542 days.

(21) Appl. No.: 11/804,633

(22) Filed: May 18, 2007

(65) Prior Publication Data

US 2007/0288238 A1 Dec. 13, 2007

Related U.S. Application Data

(63) Continuation-in-part of application No. 11/152,922, filed on Jun. 15, 2005.

(51) Int. Cl.
*G10L 15/20* (2006.01)
*G10L 15/04* (2006.01)
*G10L 17/00* (2006.01)

(52) U.S. Cl. ......................... 704/253; 704/233; 704/248

(58) Field of Classification Search .................. 704/253, 704/248

See application file for complete search history.

(56) References Cited

U.S. PATENT DOCUMENTS 55,201 A 5/1866 Cushing
4,435,617 A * 3/1984 Griggs .......................... 704/254
4,486,900 A 12/1984 Cox et al.
4,531,228 A 7/1985 Noso et al.
4,532,648 A * 7/1985 Noso et al. .................... 704/275
4,630,305 A 12/1986 Borth et al.
4,701,955 A * 10/1987 Taguchi ........................ 704/223
4,811,404 A 3/1989 Vilmur et al.
4,843,562 A 6/1989 Kenyon et al.
4,856,067 A * 8/1989 Yamada et al. ............... 704/234
4,945,566 A 7/1990 Mergel et al.
4,989,248 A * 1/1991 Schalk et al. ................. 704/252
5,027,410 A 6/1991 Williamson et al.
5,056,150 A 10/1991 Yu et al.
5,146,539 A 9/1992 Doddington et al.
5,151,940 A * 9/1992 Okazaki et al. ............... 704/253

(Continued)

FOREIGN PATENT DOCUMENTS

CA 2158847 9/1994

(Continued)

OTHER PUBLICATIONS

Turner, John M. and Dickinson, Bradley W. , "A Variable Frame Length Linear Predicitive Coder", "Acoustics, Speech, and Signal Processing, IEEE International Conference on ICASSP '78.", vol. 3, pp. 454-457.*

(Continued)

*Primary Examiner* — Talivaldis Ivars Smits
*Assistant Examiner* — Jesse Pullias
(74) *Attorney, Agent, or Firm* — Brinks Hofer Gilson & Lione

(57) ABSTRACT

An end-pointer determines a beginning and an end of a speech segment. The end-pointer includes a voice triggering module that identifies a portion of an audio stream that has an audio speech segment. A rule module communicates with the voice triggering module. The rule module includes a plurality of rules used to analyze a part of the audio stream to detect a beginning and an end of the audio speech segment. A consonant detector detects occurrences of a high frequency consonant in the portion of the audio stream.

43 Claims, 21 Drawing Sheets

U.S. PATENT DOCUMENTS

| | | | | |
|---|---|---|---|---|
| 5,152,007 | A * | 9/1992 | Uribe | 455/116 |
| 5,201,028 | A * | 4/1993 | Theis | 704/200 |
| 5,293,452 | A | 3/1994 | Picone et al. | |
| 5,305,422 | A * | 4/1994 | Junqua | 704/253 |
| 5,313,555 | A | 5/1994 | Kamiya | |
| 5,400,409 | A | 3/1995 | Linhard | |
| 5,408,583 | A | 4/1995 | Watanabe et al. | |
| 5,479,517 | A | 12/1995 | Linhard | |
| 5,495,415 | A | 2/1996 | Ribbens et al. | |
| 5,502,688 | A | 3/1996 | Recchione et al. | |
| 5,526,466 | A | 6/1996 | Takizawa | |
| 5,568,559 | A | 10/1996 | Makino | |
| 5,572,623 | A | 11/1996 | Pastor | |
| 5,584,295 | A | 12/1996 | Muller et al. | |
| 5,596,680 | A * | 1/1997 | Chow et al. | 704/248 |
| 5,617,508 | A | 4/1997 | Reaves | |
| 5,677,987 | A | 10/1997 | Seki et al. | |
| 5,680,508 | A | 10/1997 | Liu | |
| 5,687,288 | A * | 11/1997 | Dobler et al. | 704/255 |
| 5,692,104 | A | 11/1997 | Chow et al. | |
| 5,701,344 | A | 12/1997 | Wakui | |
| 5,732,392 | A * | 3/1998 | Mizuno et al. | 704/233 |
| 5,794,195 | A | 8/1998 | Hormann et al. | |
| 5,933,801 | A | 8/1999 | Fink et al. | |
| 5,949,888 | A | 9/1999 | Gupta et al. | |
| 5,963,901 | A * | 10/1999 | Vahatalo et al. | 704/233 |
| 6,011,853 | A | 1/2000 | Koski et al. | |
| 6,021,387 | A * | 2/2000 | Mozer et al. | 704/232 |
| 6,029,130 | A * | 2/2000 | Ariyoshi | 704/248 |
| 6,098,040 | A | 8/2000 | Petroni et al. | |
| 6,163,608 | A | 12/2000 | Romesburg et al. | |
| 6,167,375 | A | 12/2000 | Miseki et al. | |
| 6,173,074 | B1 | 1/2001 | Russo | |
| 6,175,602 | B1 | 1/2001 | Gustafsson et al. | |
| 6,192,134 | B1 | 2/2001 | White et al. | |
| 6,199,035 | B1 | 3/2001 | Lakaniemi et al. | |
| 6,216,103 | B1 * | 4/2001 | Wu et al. | 704/253 |
| 6,240,381 | B1 * | 5/2001 | Newson | 704/214 |
| 6,304,844 | B1 * | 10/2001 | Pan et al. | 704/257 |
| 6,317,711 | B1 * | 11/2001 | Muroi | 704/253 |
| 6,324,509 | B1 * | 11/2001 | Bi et al. | 704/248 |
| 6,356,868 | B1 * | 3/2002 | Yuschik et al. | 704/246 |
| 6,405,168 | B1 | 6/2002 | Bayya et al. | |
| 6,434,246 | B1 | 8/2002 | Kates et al. | |
| 6,453,285 | B1 * | 9/2002 | Anderson et al. | 704/210 |
| 6,487,532 | B1 * | 11/2002 | Schoofs et al. | 704/251 |
| 6,507,814 | B1 | 1/2003 | Gao | |
| 6,535,851 | B1 * | 3/2003 | Fanty et al. | 704/249 |
| 6,574,592 | B1 * | 6/2003 | Nankawa et al. | 704/206 |
| 6,574,601 | B1 * | 6/2003 | Brown et al. | 704/270.1 |
| 6,587,816 | B1 | 7/2003 | Chazan et al. | |
| 6,643,619 | B1 | 11/2003 | Linhard et al. | |
| 6,687,669 | B1 | 2/2004 | Schrögmeier et al. | |
| 6,711,540 | B1 * | 3/2004 | Bartkowiak | 704/226 |
| 6,721,706 | B1 * | 4/2004 | Strubbe et al. | 704/275 |
| 6,782,363 | B2 | 8/2004 | Lee et al. | |
| 6,822,507 | B2 | 11/2004 | Buchele | |
| 6,850,882 | B1 * | 2/2005 | Rothenberg | 704/211 |
| 6,859,420 | B1 | 2/2005 | Coney et al. | |
| 6,873,953 | B1 * | 3/2005 | Lennig | 704/253 |
| 6,910,011 | B1 | 6/2005 | Zakarauskas | |
| 6,996,252 | B2 * | 2/2006 | Reed et al. | 382/100 |
| 7,117,149 | B1 | 10/2006 | Zakarauskas | |
| 7,146,319 | B2 * | 12/2006 | Hunt | 704/254 |
| 7,535,859 | B2 | 5/2009 | Brox | |
| 2001/0028713 | A1 | 10/2001 | Walker | |
| 2002/0071573 | A1 | 6/2002 | Finn | |
| 2002/0176589 | A1 | 11/2002 | Buck et al. | |
| 2003/0040908 | A1 | 2/2003 | Yang et al. | |
| 2003/0120487 | A1 * | 6/2003 | Wang | 704/233 |
| 2003/0216907 | A1 | 11/2003 | Thomas | |
| 2004/0078200 | A1 | 4/2004 | Alves | |
| 2004/0138882 | A1 | 7/2004 | Miyazawa | |
| 2004/0165736 | A1 | 8/2004 | Hetherington et al. | |
| 2004/0167777 | A1 | 8/2004 | Hetherington et al. | |
| 2005/0096900 | A1 * | 5/2005 | Bossemeyer et al. | 704/219 |
| 2005/0114128 | A1 | 5/2005 | Hetherington et al. | |
| 2005/0240401 | A1 | 10/2005 | Ebenezer | |
| 2006/0034447 | A1 | 2/2006 | Alves et al. | |
| 2006/0053003 | A1 * | 3/2006 | Suzuki et al. | 704/216 |
| 2006/0074646 | A1 | 4/2006 | Alves et al. | |
| 2006/0080096 | A1 * | 4/2006 | Thomas et al. | 704/234 |
| 2006/0100868 | A1 | 5/2006 | Hetherington et al. | |
| 2006/0115095 | A1 | 6/2006 | Glesbrecht et al. | |
| 2006/0116873 | A1 | 6/2006 | Hetherington et al. | |
| 2006/0136199 | A1 | 6/2006 | Nongpiur et al. | |
| 2006/0178881 | A1 * | 8/2006 | Oh et al. | 704/233 |
| 2006/0251268 | A1 | 11/2006 | Hetherington et al. | |
| 2007/0033031 | A1 | 2/2007 | Zakarauskas | |
| 2007/0219797 | A1 * | 9/2007 | Liu et al. | 704/257 |
| 2007/0288238 | A1 * | 12/2007 | Hetherington et al. | 704/248 |

FOREIGN PATENT DOCUMENTS

| | | | |
|---|---|---|---|
| CA | 2157496 | | 10/1994 |
| CA | 2158064 | | 10/1994 |
| CN | 1042790 | A | 6/1990 |
| EP | 0 076 687 | A1 | 4/1983 |
| EP | 0 629 996 | A2 | 12/1994 |
| EP | 0 629 996 | A3 | 12/1994 |
| EP | 0 750 291 | A1 | 12/1996 |
| EP | 0 543 329 | B1 | 2/2002 |
| EP | 1 450 353 | A1 | 8/2004 |
| EP | 1 450 354 | A1 | 8/2004 |
| EP | 1 669 983 | A1 | 6/2006 |
| JP | 06269084 | A2 | 9/1994 |
| JP | 06319193 | A | 11/1994 |
| JP | 2000-250565 | | 9/2000 |
| KR | 10-1999-0077910 | A | 10/1999 |
| KR | 10-2001-0091093 | A | 10/2001 |
| WO | WO 00-41169 | A1 | 7/2000 |
| WO | WO 0156255 | A1 | 8/2001 |
| WO | WO 0173761 | A1 | 10/2001 |
| WO | WO 2004/0111996 | | 12/2004 |

OTHER PUBLICATIONS

Avendano, C., Hermansky, H., "Study on the Dereverberation of Speech Based on Temporal Envelope Filtering," Proc. ICSLP '96, pp. 889-892, Oct. 1996.

Learned, R.E. et al., A Wavelet Packet Approach to Transient Signal Classification, Applied and Computational Harmonic Analysis, Jul. 1995, pp, 265-278, vol. 2, No. 3, USA, XP 000972660. ISSN: 1063-5203. abstract.

Nakatani, T., Miyoshi, M., and Kinoshita, K., "Implementation and Effects of Single Channel Dereverberation Based on the Harmonic Structure of Speech," Proc. of IWAENC-2003, pp. 91-94, Sep. 2003.

Puder, H. et al., "Improved Noise Reduction for Hands-Free Car Phones Utilizing Information on a Vehicle and Engine Speeds", Sep. 4-8, 2000, pp. 1851-1854, vol. 3, XP009030255, 2000. Tampere, Finland, Tampere Univ. Technology, Finland Abstract.

Quatieri, T.F. et al., Noise Reduction Using a Soft-Dection/Decision Sine-Wave Vector Quantizer, International Conference on Acoustics, Speech & Signal Processing, Apr. 3, 1990, pp. 821-824, vol. Conf. 15, IEEE ICASSP, New York, US XP000146895, Abstract, Paragraph 3.1.

Quelavoine, R. et al., Transients Recognition in Underwater Acoustic with Multilayer Neural Networks, Engineering Benefits from Neural Networks, Proceedings of the International Conference EANN 1998, Gibraltar, Jun. 10-12, 1998 pp. 330-333, XP 000974500. 1998, Turku, Finland, Syst. Eng. Assoc., Finland. ISBN: 951-97868-0-5. abstract, p. 30 paragraph 1.

Seely, S., "An Introduction to Engineering Systems", Pergamon Press Inc., 1972, pp. 7-10.

Shust, Michael R. and Rogers, James C., "Electronic Removal of Outdoor Microphone Wind Noise", obtained from the Internet on Oct. 5, 2006 at: <http://www.acoustics.org/press/136th/mshust.htm>, 6 pages.

Simon, G., Detection of Harmonic Burst Signals, International Journal Circuit Theory and Applications, Jul. 1985, vol. 13, No. 3, pp. 195-201, UK, XP 000974305. ISSN: 0098-9886. abstract.

Vieira, J., "Automatic Estimation of Reverberation Time", Audio Engineering Society, Convention Paper 6107, 116th Convention, May 8-11, 2004, Berlin, Germany, pp. 1-7.

Wahab A. et al., "Intelligent Dashboard With Speech Enhancement", Information, Communications, and Signal Processing, 1997. ICICS, Proceedings of 1997 International Conference on Singapore, Sep. 9-12, 1997, New York, NY, USA, IEEE, pp. 993-997.
Savoji, M. H. "A Robust Algorithm for Accurate Endpointing of Speech Signals" Speech Communication, Elsevier Science Publishers, Amsterdam, NL, vol. 8, No. 1, Mar. 1, 1989 (pp. 45-60).
Berk et al., "Data Analysis with Microsoft Excel", Duxbury Press, 1998, pp. 236-239 and 256-259.
Fiori, S., Uncini, A., and Piazza, F., "Blind Deconvolution by Modified Bussgang Algorithm", Dept. of Electronics and Automatics—University of Ancona (Italy), ISCAS 1999.
Shust, Michael R. and Rogers, James C., Abstract of "Active Removal of Wind Noise From Outdoor Microphones Using Local Velocity Measurements", *J. Acoust. Soc. Am.*, vol. 104, No. 3, Pt 2, 1998, 1 page.
Zakarauskas, P., Detection and Localization of Nondeterministic Transients in Time series and Application to Ice-Cracking Sound, Digital Signal Processing, 1993, vol. 3, No. 1, pp. 36-45, Academic Press, Orlando, FL, USA, XP 000361270, ISSN: 1051-2004. entire document.
Ying et al.; "Endpoint Detection of Isolated Utterances Based on a Modified Teager Energy Estimate"; In Proc. IEEE ICASSP, vol. 2; pp. 732-735; 1993.
Canadian Examination Report of related application No. 2,575, 632, Issued May 28, 2010.
European Search Report dated Aug. 31, 2007 from corresponding European Application No. 06721766.1, 13 pages.
International Preliminary Report on Patentability dated Jan. 3, 2008 from corresponding PCT Application No. PCT/CA2006/000512, 10 pages.
International Search Report and Written Opinion dated Jun. 6, 2006 from corresponding PCT Application No. PCT/CA2006/000512, 16 pages.
Office Action dated Jun. 12, 2010 from corresponding Chinese Application No. 200680000746.6, 11 pages.
Office Action dated Mar. 27, 2008 from corresponding Korean Application No. 10-2007-7002573, 11 pages.
Office Action dated Mar. 31, 2009 from corresponding Korean Application No. 10-2007-7002573, 2 pages.
Office Action dated Jan. 7, 2010 from corresponding Japanese Application No. 2007-524151, 7 pages.
Office Action dated Aug. 17, 2010 from corresponding Japanese Application No. 2007-524151, 3 pages.
Office Action dated Jun. 6, 2011 for corresponding Japanese Patent Application No. 2007-524151, 9 pages.

* cited by examiner

SPEECH END-POINTER

PRIORITY CLAIM

This application is a continuation-in-part of U.S. application Ser. No. 11/152,922 filed Jun. 15, 2005. The entire content of the application is incorporated herein by reference, except that in the event of any inconsistent disclosure from the present application, the disclosure herein shall be deemed to prevail.

BACKGROUND OF THE INVENTION

1. Technical Field

These inventions relate to automatic speech recognition, and more particularly, to systems that identify speech from non-speech.

2. Related Art

Automatic speech recognition (ASR) systems convert recorded voice into commands that may be used to carry out tasks. Command recognition may be challenging in high-noise environments such as in automobiles. One technique attempts to improve ASR performance by submitting only relevant data to an ASR system. Unfortunately, some techniques fail in non-stationary noise environments, where transient noises like clicks, bumps, pops, coughs, etc trigger recognition errors. Therefore, a need exists for a system that identifies speech in noisy conditions.

SUMMARY

An end-pointer determines a beginning and an end of a speech segment. The end-pointer includes a voice triggering module that identifies a portion of an audio stream that has an audio speech segment. A rule module communicates with the voice triggering module. The rule module includes a plurality of rules used to analyze a part of the audio stream to detect a beginning and end of an audio speech segment. A consonant detector detects occurrences of a high frequency consonant in the portion of the audio stream.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The inventions can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

ASR systems are tasked with recognizing spoken commands. These tasks may be facilitated by sending voice segments to an ASR engine. A voice segment may be identified through end-pointing logic. Some end-pointing logic applies rules that identify the duration of consonants and pauses before and/or after a vowel. The rules may monitor a maximum duration of non-voiced energy, a maximum duration of continuous silence before a vowel, a maximum duration of continuous silence after a vowel, a maximum time before a vowel, a maximum time after a vowel, a maximum number of isolated non-voiced energy events before a vowel, and/or a maximum number of isolated non-voiced energy events after a vowel. When a vowel is detected, the end-pointing logic may follow a signal-to-noise (SNR) contour forward and backward in time. The limits of the end-pointing logic may occur when the amplitude reaches a predetermined level which may be zero or near zero. While searching, the logic identifies voiced and unvoiced intervals to be processed by an ASR engine.

Some end-pointers examine one or more characteristics of an audio stream for a triggering characteristic. A triggering characteristic may identify a speech interval that includes voiced or unvoiced segments. Voiced segments may have a near periodic structure in the time-domain like vowels. Non-voiced segments may have a noise-like structure (nonperiodic) in the time domain like a fricative. The end-pointers analyze one or more dynamic aspects of an audio stream. The dynamic aspects may include: (1) characteristics that reflect a speaker's pace (e.g., rate of speech), pitch, etc.; (2) a speaker's expected response (such as a "yes" or "no" response); and/or (3) environmental characteristics, such as a background noise level, echo, etc.

Figure 1:
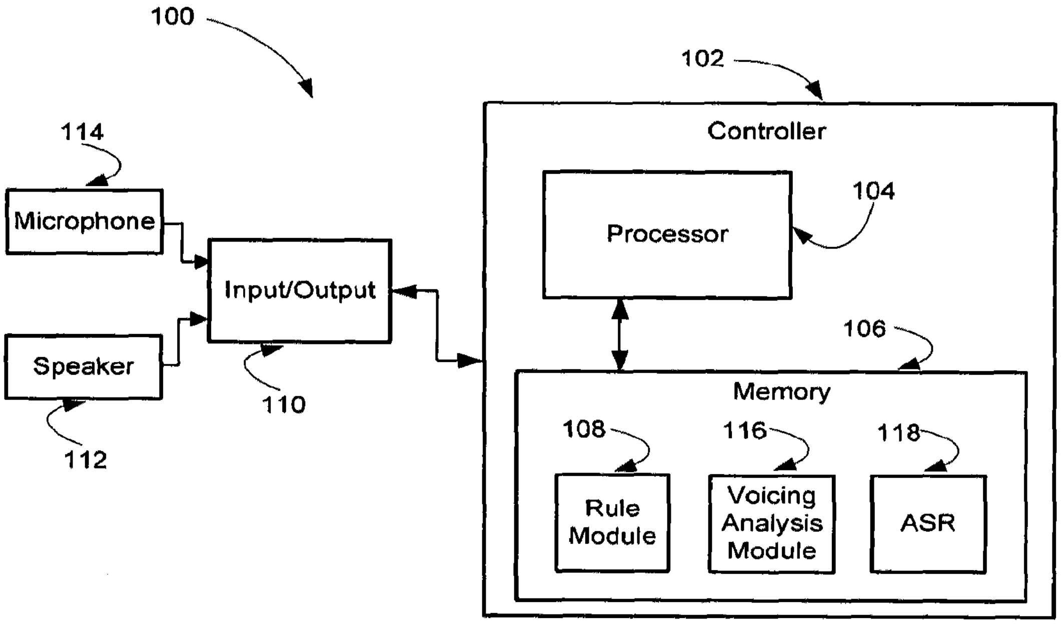
FIG. 1 is a block diagram of a speech end-pointing system.

FIG. 1 is a block diagram of a speech end-pointing system. The end-pointing system 100 encompasses hardware and/or software running on one or more processors on top of one or more operating systems. The end-pointing system 100 includes a controller 102 and a processor 104 linked to a remote (not shown) and/or local memory 106. The processor 104 accesses the memory 106 through a unidirectional or a bidirectional bus. The memory 106 may be partitioned to store a portion of an input audio stream, a rule module 108, and support files that detect the beginning and/or end of an audio segment, and a voicing analysis module 116. When read by the processor 104, the voicing analysis module 116 may detect a triggering characteristic that identifies a speech interval. When integrated within or when a unitary part of controller serving an ASR engine, the speech interval may be processed when the ASR code 118 is read by the processor 104.

The local or remote memory 106 may buffer audio data received before or during an end-pointing process. The processor 104 may communicate through an input/output (I/O) interface 110 that receives input from devices that convert sound waves into electrical, optical, or operational signals 114. The I/O 110 may transmit these signals to devices 112 that convert signals into sound. The controller 104 and/or processor 104 may execute the software or code that implements each of the processes described herein including those described in FIGS. 3, 4, 10, and 13.

Figure 2:
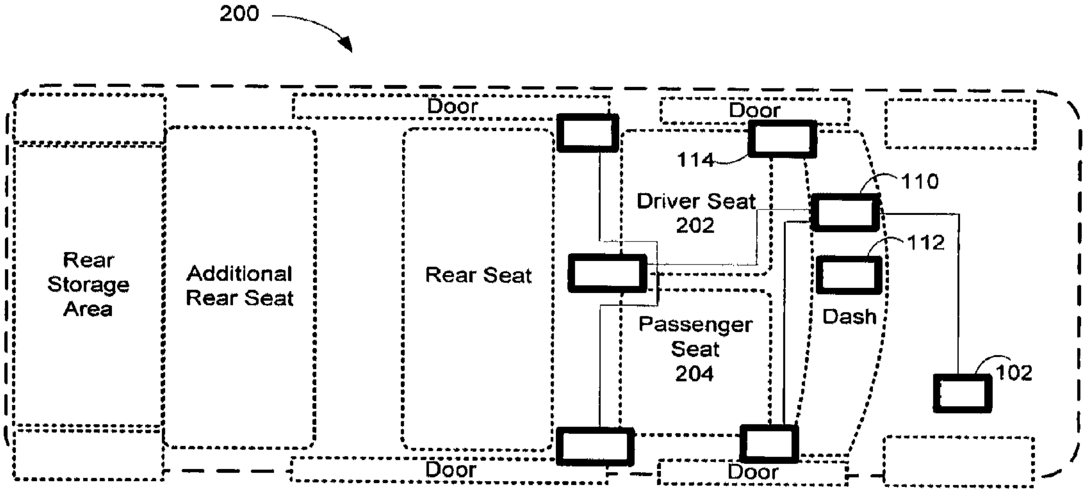
FIG. 2 is a partial illustration of a speech end-pointing system incorporated into a vehicle.

FIG. 2 illustrates an end-pointer system 100 within a vehicle 200. The controller 102 may be programmed within or linked to a vehicle on-board computer, such as an electronic control unit, an electronic control module, and/or a body control module. Some systems may be located remote from the vehicle. Each system may communicate with vehicle logic through one or more serial or parallel buses or wireless protocols. The protocols may include one or more J1850VPW, J1850PWM, ISO, ISO9141-2, ISO14230, CAN, High Speed CAN, MOST, LIN, IDB-1394, IDB-C, D2B, Bluetooth, TTCAN, TTP, or other protocols such as a protocol marketed under the trademark FlexRay.

Figure 3:
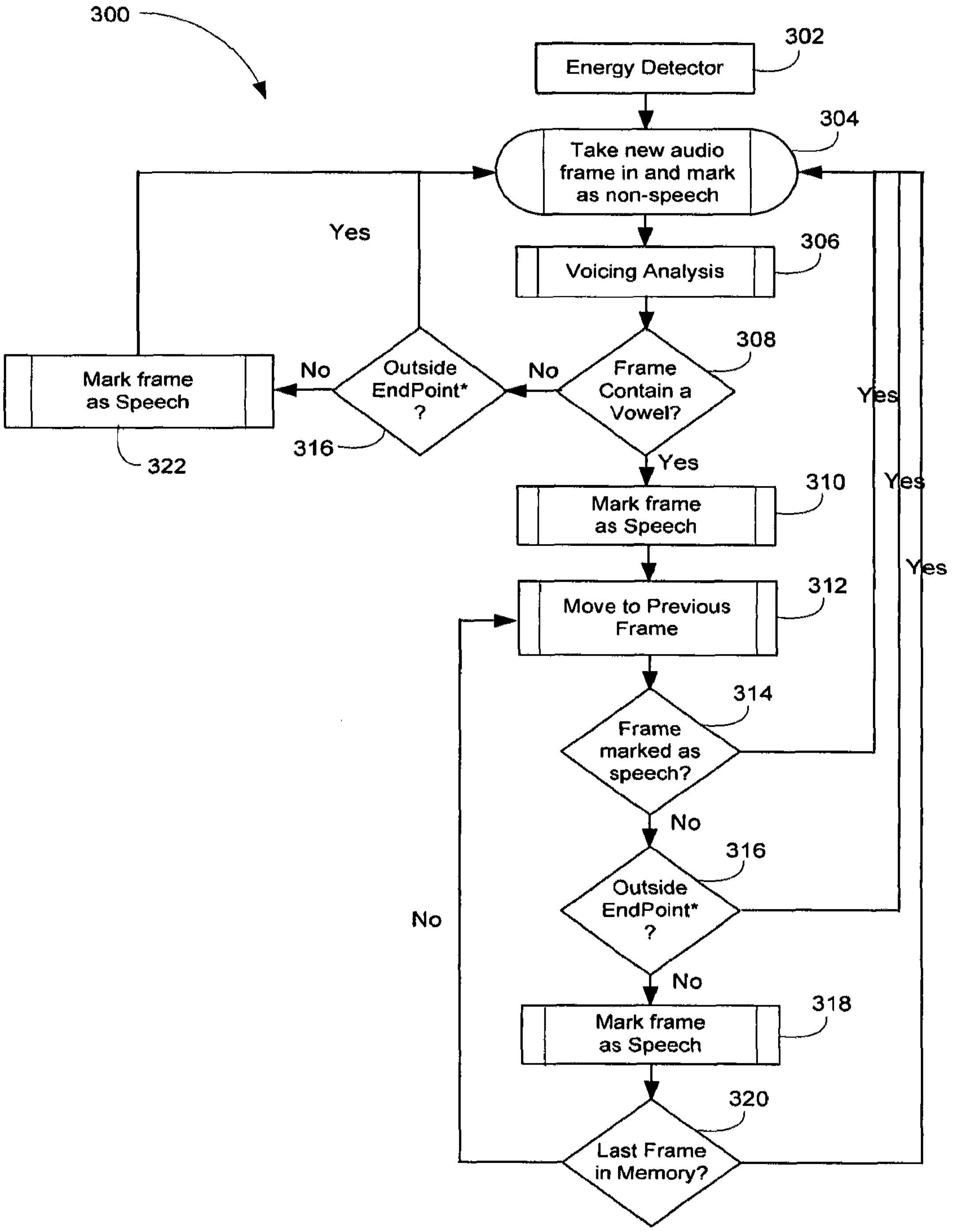
FIG. 3 is a speech end-pointer-process.

FIG. 3 is a flowchart of a speech end-pointer process. The process operates by dividing an input audio stream into discrete segments or packages of information, such as frames. The input audio stream may be analyzed on a frame-by-frame basis. In some systems, the fixed or variable length frames may be comprised of about 10 ms to about 100 ms of audio input. The system may buffer a predetermined amount of data, such as about 350 ms to about 500 ms audio input data, before processing is carried out. An energy detector 302 (or process) may be used to detect voiced and unvoiced sound. Some energy detectors and processes compare the amount of energy in a frame to a noise estimate. The noise estimate may be constant or may vary dynamically. The difference in decibels (dB), or ratio in power, may be an instantaneous signal to noise ratio (SNR).

Initially, the process designates some or all of the initial frames as not speech 304. When energy is detected, voicing analysis of the current frame or, designated $frame_n$ occurs at 306. The voicing analysis described in U.S. Ser. No. 11/131,150, filed May 17, 2005, which is incorporated herein by reference, may be used. The voicing analysis monitors triggering characteristics that may be present in $frame_n$. The voicing analysis may detect higher frequency consonants such as an "s" or "x" in a $frame_n$. Alternatively, the voicing analysis may detect vowels. To further explain the process, a vowel triggering characteristic is further described.

Voicing analysis detects vowels in frames in FIG. 3. A process may identify vowels through a pitch estimator. The pitch estimator may look for a periodic signal in a frame to identify a vowel. Alternatively, the pitch estimator may look for a predetermined threshold at a predetermined frequency to identify vowels.

When the voicing analysis detects a vowel in $frame_n$, the $frame_n$ is marked as speech at 310. The system then processes one or more previous frames. A previous frame may be an immediate preceding frame, $frame_{n-1}$ at 312. The system may determine whether the previous frame was previously marked as speech at 314. If the previous frame was marked as speech (e.g., answer of "Yes" to block 314), the system analyzes a new audio frame at 304. If the previous frame was not marked as speech (e.g., answer of "No" to 314), the process applies one or more rules to determine whether the frame should be marked as speech.

Block 316 designates decision block "Outside EndPoint" that applies one or more rules to determine when the frame should be marked as speech. The rules may be applied to any part of the audio segment, such as a frame or a group of frames. The rules may determine whether the current frame or frames contain speech. If speech is detected, the frame is designated within an end-point. If not, the frame is designated outside of the endpoint.

If a $frame_{n-1}$ is outside of the end-point (e.g., no speech is present), a new audio frame, $frame_{n+1}$, may be processed. It may be initially designated as non-speech, at block 304. If the decision at 316 indicates that $frame_{n-1}$ is within the end-point (e.g., speech is present), then $frame_{n-1}$ is designated or marked as speech at 318. The previous audio stream is then analyzed, until the last frame is read from a local or remote memory at 320.

Figure 4:
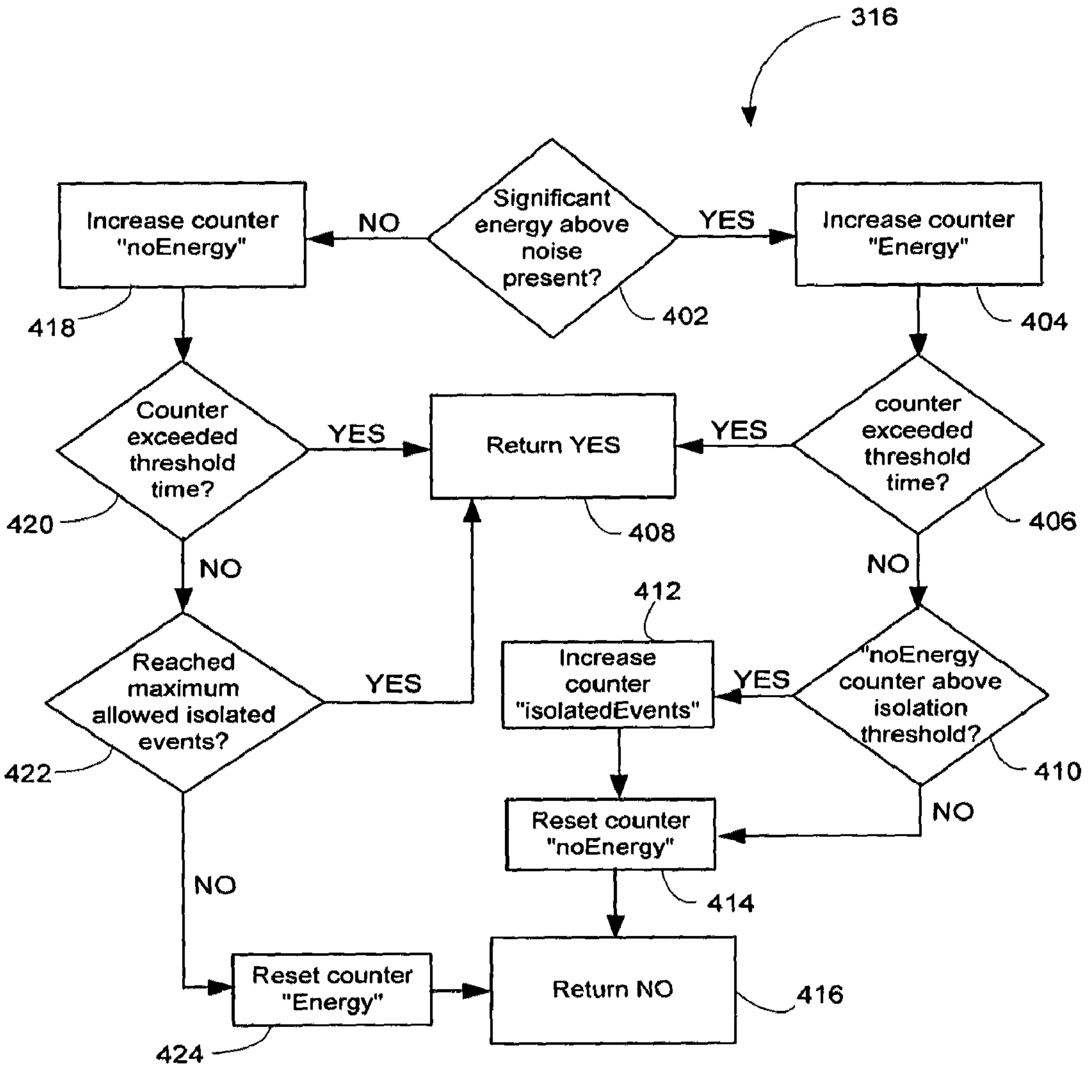
FIG. 4 is a more detailed flowchart of a portion of FIG. 3.

FIG. 4 is an exemplary detailed process of 316. Act 316 may apply one or more rules. The rules relate to aspects that may identify the presence and/or absence of speech. In FIG. 4, the rules detect verbal segments by identifying a beginning and/or an endpoint of a spoken utterance. Some rules are based on analyzing an event (e.g. voiced energy, un-voiced energy, an absence/presence of silence, etc.). Other rules are based on a combination of events (e.g. un-voiced energy followed by silence followed by voiced energy, voiced energy followed by silence followed by unvoiced energy, silence followed by un-voiced energy followed by silence, etc.).

The rules may examine transitions into energy events from periods of silence or from periods of silence into energy events. A rule may analyze the number of transitions before a vowel is detected; another rule may determine that speech may include no more than one transition between an unvoiced event or silence and a vowel. Some rules may analyze the number of transitions after a vowel is detected with a rule that speech may include no more than two transitions from an unvoiced event or silence after a vowel is detected.

One or more rules may be based on the occurrence of one or multiple events (e.g. voiced energy, un-voiced energy, an absence/presence of silence, etc.). A rule may analyze the time preceding an event. Some rules may be triggered by the lapse of time before a vowel is detected. A rule may expect a vowel to occur within a variable range such as about a 300 ms to 400 ms interval or a rule may expect a vowel to be detected within a predetermined time period (e.g., about 350 ms in some processes). Some rules determine a portion of speech intervals based on the time following an event. When a vowel is detected a rule may extend a speech interval by a fixed or variable length. In some processes the time period may comprise a range (e.g., about 400 ms to 800 ms in some processes) or a predetermined time limit (e.g., about 600 ms in some processes).

Some rules may examine the duration of an event. The rules may examine the duration of a detected energy (e.g., voiced or unvoiced) or the lack of energy. A rule may analyze the duration of continuous unvoiced energy. A rule may establish that continuous unvoiced energy may occur within a variable range (e.g., about 150 ms to about 300 ms in some processes), or may occur within a predetermined limit (e.g., about 200 ms in some processes). A rule may analyze the duration of continuous silence before a vowel is detected. A rule may establish that speech may include a period of continuous silence before a vowel is detected within a variable range (e.g., about 50 ms to about 80 ms in some processes) or at a predetermined limit (e.g., about 70 ms in some processes). A rule may analyze the time duration of continuous silence after a vowel is detected. Such a rule may establish that speech may include a duration of continuous silence after a vowel is detected within a variable range (e.g., about 200 ms to about 300 ms in some processes) or a rule may establish that silence occurs across a predetermined time limit (e.g., about 250 ms in some processes).

At 402, the process determines if a frame or group of frames has an energy level above a background noise level. A frame or group of frames having more energy than a background noise level may be analyzed based on its duration or its relationship to an event. If the frame or group of frames does not have more energy than a background noise level, then the frame or group of frames may be analyzed based on its duration or relationship to one or more events. In some systems the events may comprise a transition into energy events from periods of silence or a transition from periods of silence into energy events.

When energy is present in the frame or a group of frames, an "energy" counter is incremented at block 404. The "energy" counter tracks time intervals. It may be incremented by a frame length. If the frame size is about 32 ms, then block 404 may increment the "energy" counter by about 32 ms. At 406, the "energy" counter is compared to a threshold. The threshold may correspond to the continuous unvoiced energy rule which may be used to determine the presence and/or absence of speech. If decision 406 determines that the threshold was exceeded, then the frame or group of frames are designated outside the end-point (e.g. no speech is present) at 408 at which point the system jumps back to 304 of FIG. 3. In some alternative processes multiple thresholds may be evaluated at 406.

If the time threshold is not exceeded by the "energy" counter at 406, then the process determines if the "noenergy" counter exceeds an isolation threshold at 410. The "noenergy" counter 418 may track time and is incremented by the frame length when a frame or group of frames does not possess energy above a noise level. The isolation threshold may comprise a threshold of time between two plosive events. A plosive relates to a speech sound produced by a closure of the oral cavity and subsequent release accompanied by a burst of air. Plosives may include the sounds /p/ in pit or /d/ in dog. An isolation threshold may vary within a range (e.g., such as about 10 ms to about 50 ms) or may be a predetermined value such as about 25 ms. If the isolation threshold is exceeded, an isolated unvoiced energy event (e.g., a plosive followed by silence) was identified, and "isolatedevents" counter 412 is incremented. The "isolatedevents" counter 412 is incremented in integer values. After incrementing the "isolatedevents" counter 412, "noenergy" counter 418 is reset at block 414. The "isolatedevents" counter may be reset due to the energy found within the frame or group of frames analyzed. If the "noenergy" counter 418 does not exceed the isolation threshold, the "noenergy" counter 418 is reset at block 414 without incrementing the "isolatedevents" counter 412. The "noenergy" counter 418 is reset because energy was found within the frame or group of frames analyzed. When the "noenergy" counter 418 is reset, the outside end-point analysis designates the frame or group of frames analyzed within the end-point (e.g. speech is present) by returning a "NO" value at 416. As a result, the system marks the analyzed frame(s) as speech at 318 or 322 of FIG. 3.

Alternatively, if the process determines that there is no energy above the noise level at 402 then the frame or group of frames analyzed contain silence or background noise. In this condition, the "noenergy" counter 418 is incremented. At 420, the process determines if the value of the "noenergy" counter exceeds a predetermined time threshold. The predetermined time threshold may correspond to the continuous non-voiced energy rule threshold which may be used to determine the presence and/or absence of speech. At 420, the process evaluates the duration of continuous silence. If the process determines that the threshold is exceeded by the value of the "noenergy" counter at 420, then the frame or group of frames are designated outside the end-point (e.g. no speech is present) at block 408. The process then proceeds to 304 of FIG. 3 where a new frame, $frame_{n+1}$, is received and marked as non-speech. Alternatively, multiple thresholds may be evaluated at 420.

If no time threshold is exceeded by the value of the "noenergy" counter 418, then the process determines if the maximum number of allowed isolated events has occurred at 422. The maximum number of allowed isolated events is a configurable or programmed parameter. If grammar is expected (e.g. a "Yes" or a "No" answer) the maximum number of allowed isolated events may be programmed to "tighten" the end-pointer's interval or band. If the maximum number of allowed isolated events is exceeded, then the frame or frames analyzed are designated as being outside the end-point (e.g. no speech is present) at block 408. The system then jumps back to block 304 where a new frame, $frame_{n+1}$, is processed and marked as non-speech.

If the maximum number of allowed isolated events is not reached, "energy" counter 404 is reset at block 424. "Energy" counter 404 may be reset when a frame of no energy is identified. When the "energy" counter 404 is reset, the outside end-point analysis designates the frame or frames analyzed inside the end-point (e.g. speech is present) by returning a "NO" value at block 416. The process then marks the analyzed frame as speech at 318 or 322 of FIG. 3.

FIGS. 5-9 show time series of a simulated audio stream, characterization plots of these signals, and spectrographs of the corresponding time series signals. The simulated audio stream 502 of FIG. 5 comprises the spoken utterances "NO" 504, "YES" 506, "NO" 504, "YES" 506, "NO" 504, "YESSSSS" 508, "NO" 504, and a number of "clicking" sounds 510. The clicking sounds may represent the sound heard when a vehicle's turn signal is engaged. Block 512 illustrates various characterization plots for the time series audio stream. Block 512 displays the number of samples along the x-axis. Plot 514 is a representation of an end-pointer marking a speech interval. When plot 514 has little or no amplitude, the end-pointer has not detected a speech segment. When plot 514 has measurable amplitude the end-pointer detected speech that may be within the bounded interval. Plot 516 represents the energy detected above a background energy level. Plot 518 represents a spoken utterance in the time domain. Block 520 illustrates a spectral representation of the audio stream in block 502.

Figure 5:
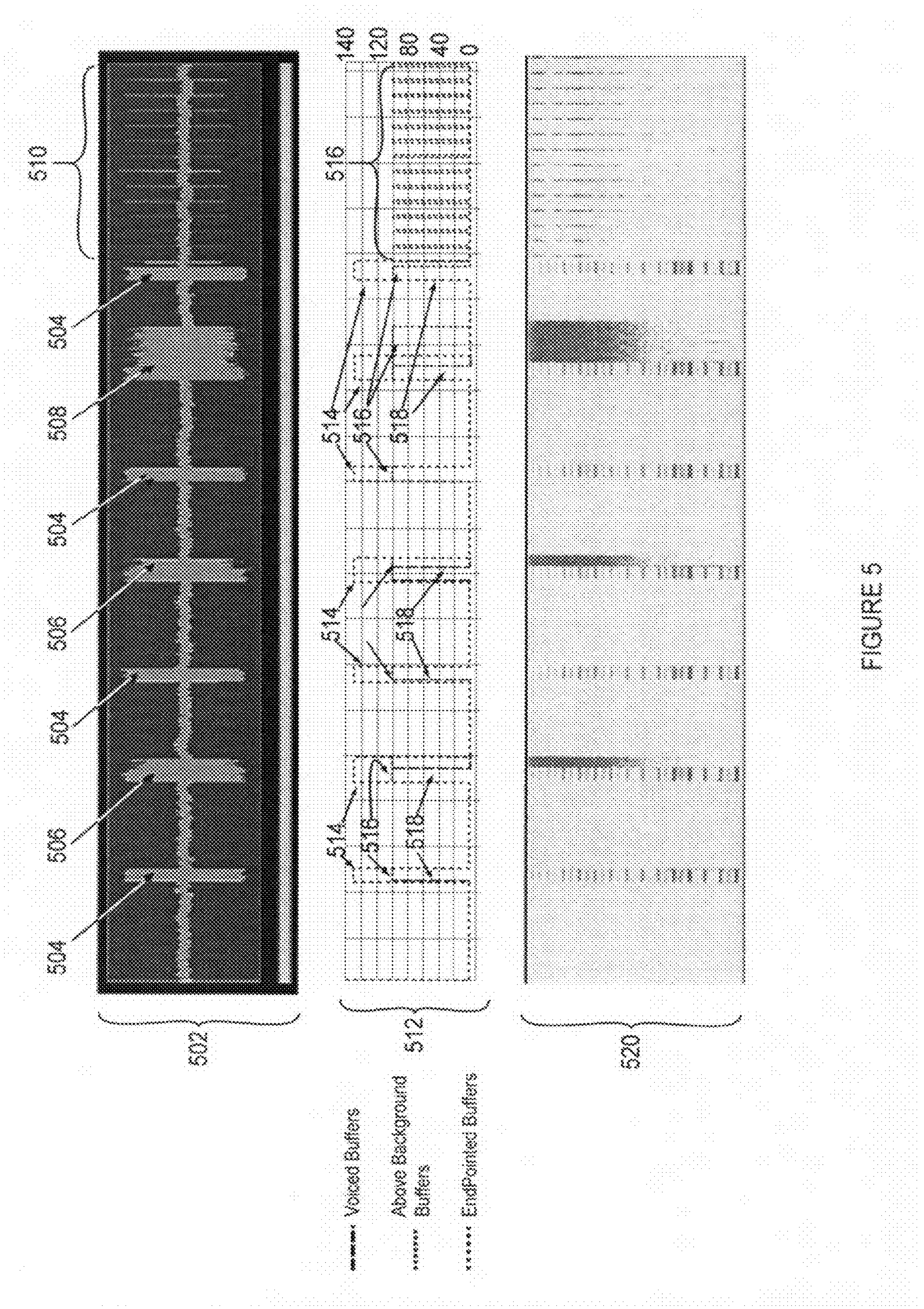
FIG. 5 is an end-pointing of simulated speech.

Block 512 illustrates how the end-pointer may respond to an input audio stream. In FIG. 5, end-pointer plot 514 captures the "NO" 504 and the "YES" 506 signals. When the "YESSSSS" 508 is processed, the end-pointer plot 514 captures a portion of the trailing "S", but when it reaches a maximum time period after a vowel or a maximum duration of continuous non-voiced energy has been exceeded (by rule) the end-pointer truncates a portion of the signal. The rule-based end-pointer sends the portion of the audio stream that is bound by end-pointer plot 514 to an ASR engine. In block 512, and FIGS. 6-9, the portion of the audio stream sent to an ASR engine may vary with the selected rule.

In FIG. 5, the detected "clicks" 510 have energy. Because no vowel was detected within that interval, the end-pointer does not capture the energy. A pause is declared which is not sent to the ASR engine.

Figure 6:
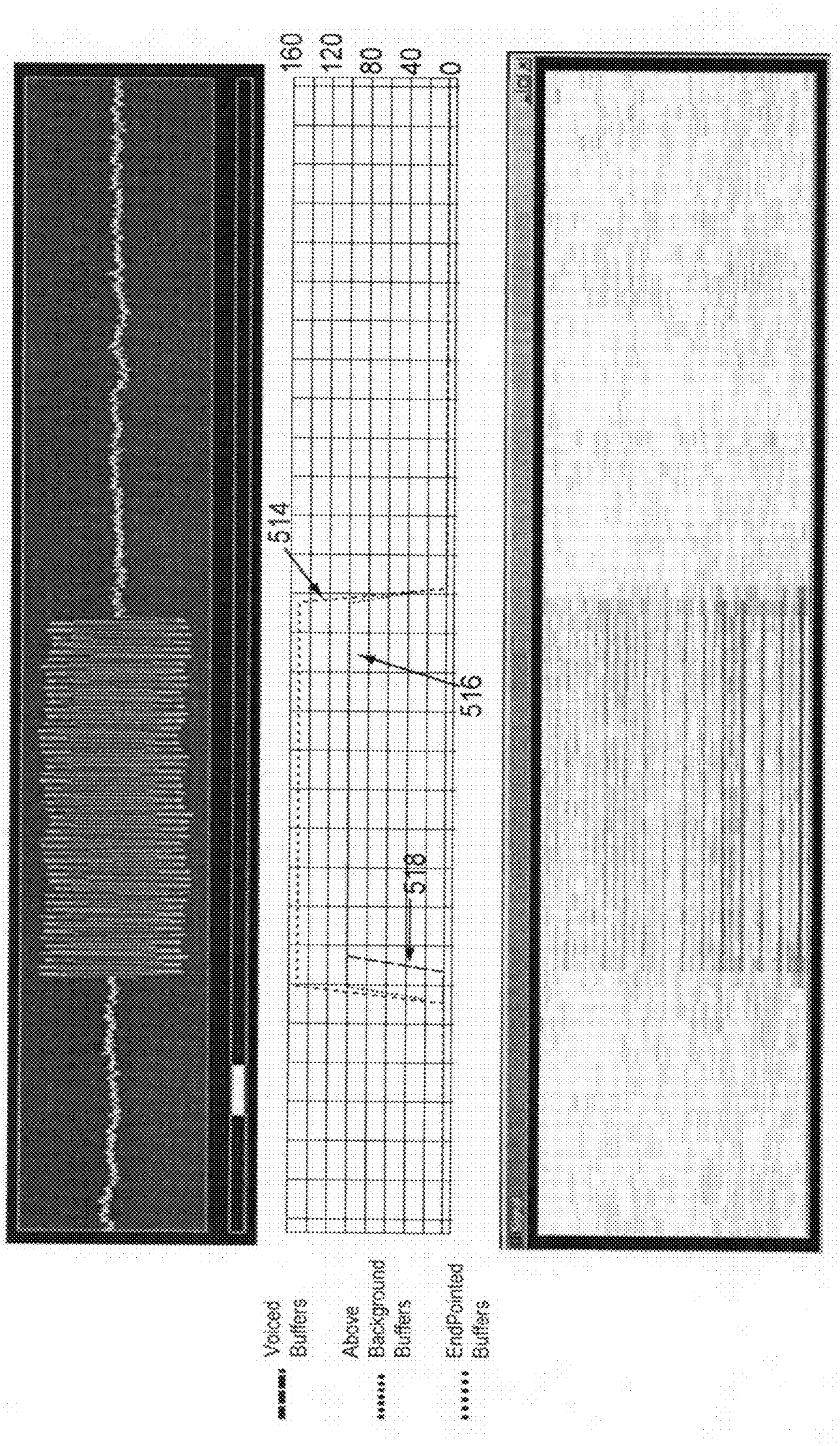
FIG. 6 is an end-pointing of simulated speech.

FIG. 6 magnifies a portion of an end-pointed "NO" 504. The lag in the spoken utterance plot 518 may be caused by time smearing. The magnitude of 518 reflects period in which energy is detected. The energy of the spoken utterance 518 is nearly constant. The passband of the end-pointer 514 begins when speech energy is detected and cuts off by rule. A rule may determine the maximum duration of continuous silence after a vowel or the maximum time following the detection of a vowel. In FIG. 6, the audio segment sent to an ASR engine comprises approximately 3150 samples.

Figure 7:
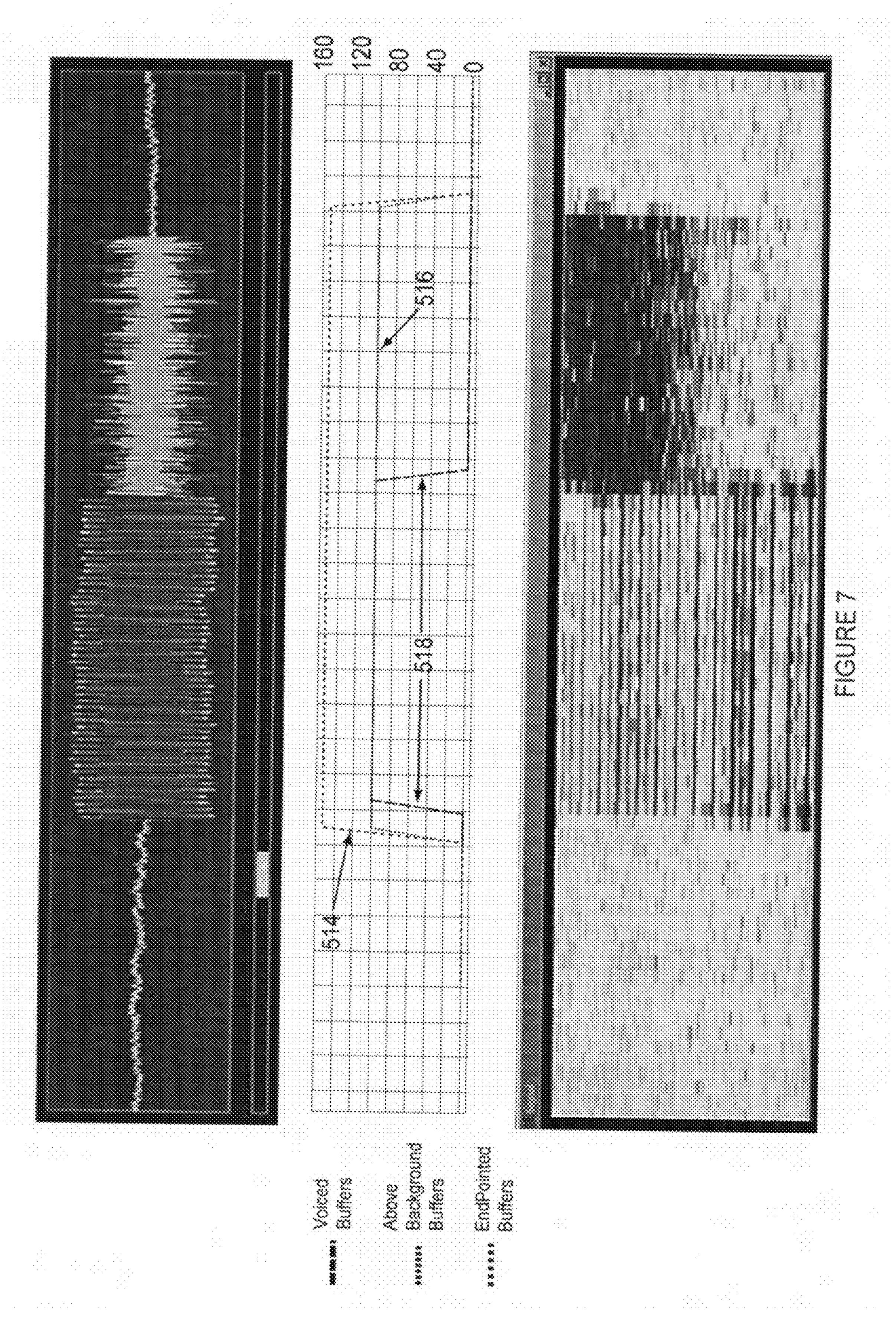
FIG. 7 is an end-pointing of simulated speech.

FIG. 7 magnifies a portion of an end-pointed "YES" 506. The lag in the spoken utterance plot 518 may be caused by time smearing. The passband of the end-pointer 514 begins when speech energy is detected and continues until the energy falls off from the random noise. The upper limit of the passband may be set by a rule that establishes the maximum duration of continuous non-voiced energy or by a rule that establishes the maximum time after a vowel is detected. In FIG. 7, the portion of the audio stream that is sent to an ASR engine comprises approximately 5550 samples.

Figure 8:
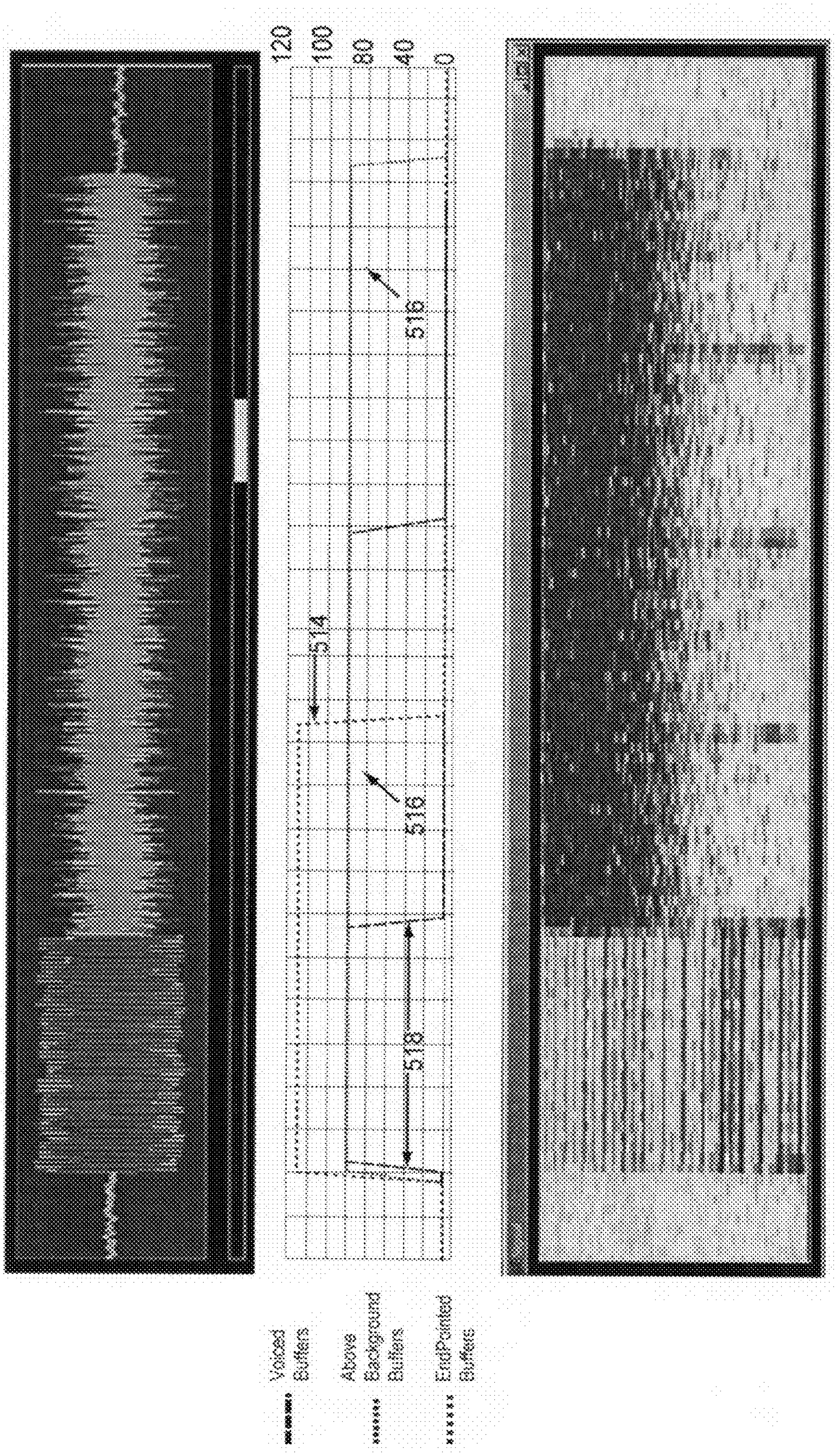
FIG. 8 is an end-pointing of simulated speech.

FIG. 8 magnifies a portion of one end-pointed "YESSSSS" 508. The end-pointer accepts the post-vowel energy as a possible consonant for a predetermined period of time. When the period lapses, a maximum duration of continuous non-voiced energy rule or a maximum time after a vowel rule may be applied limiting the data passed to an ASR engine. In FIG. 8, the portion of the audio stream that is sent to an ASR engine comprises approximately 5750 samples. Although the spoken utterance continues for an additional 6500 samples, in one system, the end-pointer truncates the sound segment by rule.

Figure 9:
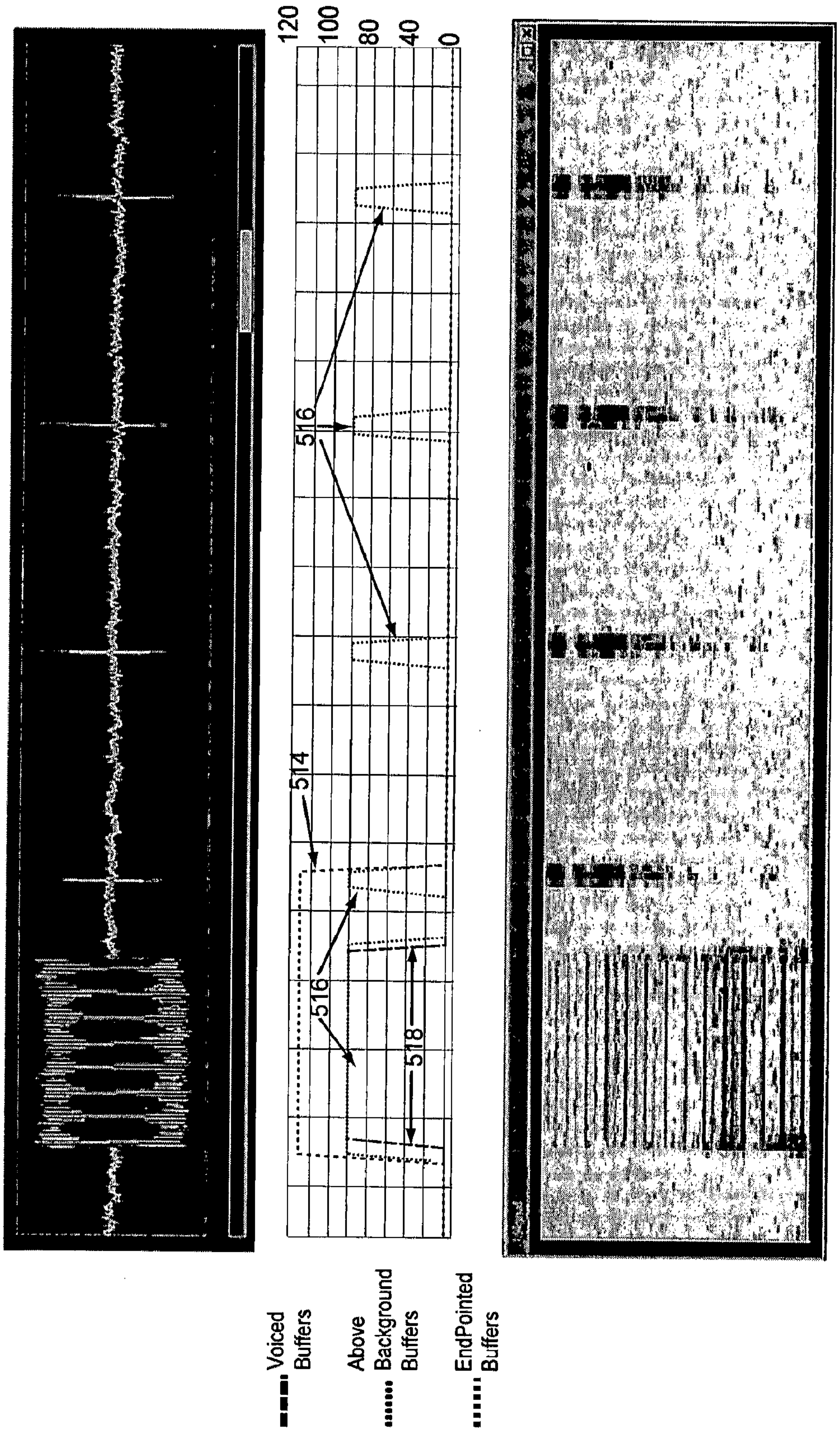
FIG. 9 is an end-pointing of simulated speech.

FIG. 9 magnifies an end-pointed "NO" 504 and several "clicks" 510. In FIG. 9, the lag in the spoken utterance plot 518 may be caused by time smearing. The passband of the end-pointer 514 begins when speech energy is detected. A click may be included within end-pointer 514 because the system detected energy above the background noise threshold.

Figure 10:
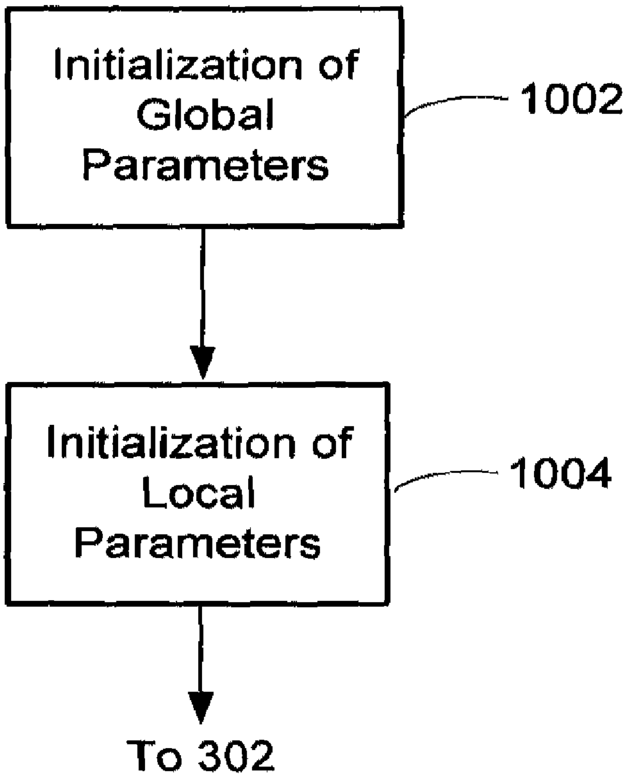
FIG. 10 is a portion of a dynamic speech end-pointing process.

Some end-pointers determine the beginning and/or end of a speech segment by analyzing a dynamic aspect of an audio stream. FIG. 10 is a partial process that analyzes the dynamic aspect of an audio segment. An initialization of global aspects occurs at 1002. Global aspects may include selected characteristics of an audio stream such as characteristics that reflect a speaker's pace (e.g., rate of speech), pitch, etc. The initialization at 1004 may be based on a speaker's expected response (such as a "yes" or "no" response); and/or environmental characteristics, such as a background noise level, echo, etc.

The global and local initializations may occur at various times throughout system operation. The background noise estimations (local aspect initialization) may occur during nonspeech intervals or when certain events occur such as when the system is powered up. The pace of a speaker's speech or pitch (global initialization) and monitoring of certain responses (local aspect initialization) may be initialized less frequently. Initialization may occur when an ASR engine communicates to an end-pointer or at other times.

During initialization periods 1002 and 1004, the end-pointer may operate at programmable default thresholds. If a threshold or timer needs to be change, the system may dynamically change the thresholds or timing values. In some systems, thresholds, times, and other variables may be loaded into an end-pointer by reading specific or general user profiles from the system's local memory or a remote memory. These values and settings may also be changed in real-time or near real-time. If the system determines that a user speaks at a fast pace, the duration of certain rules may be changed and retained within the local or remote profiles. If the system uses a training mode, these parameters may also be programmed or set during a training session.

The operation of some dynamic end-pointer processes may have similar functionality to the processes described in FIGS. 3 and 4. Some dynamic end-pointer processes may include one or more thresholds and/or rules. In some applications the "Outside Endpoint" routine, block 316 is dynamically configured. If a large background noise is detected, the noise threshold at 402 may be raised dynamically. This dynamic re-configuration may cause the dynamic end-pointer to reject more transients and non-speech Sounds. Any threshold utilized by the dynamic end-pointer may be dynamically configured.

An alternative end-pointer system includes a high frequency consonant detector or s-detector that detects high-frequency consonants. The high frequency consonant detector calculates the likelihood of a high-frequency consonant by comparing a temporally smoothed SNR in a high-frequency band to a SNR in one or more low frequency bands. Some systems select the low frequency bands from a predetermined plurality of lower frequency bands (e.g., two, three, four, five, etc. of the lower frequency bands). The difference between these SNR measurements is converted into a temporally smoothed probability through probability logic that generates a ratio between about zero and one hundred that predicts the likelihood of a consonant.

Figure 11:
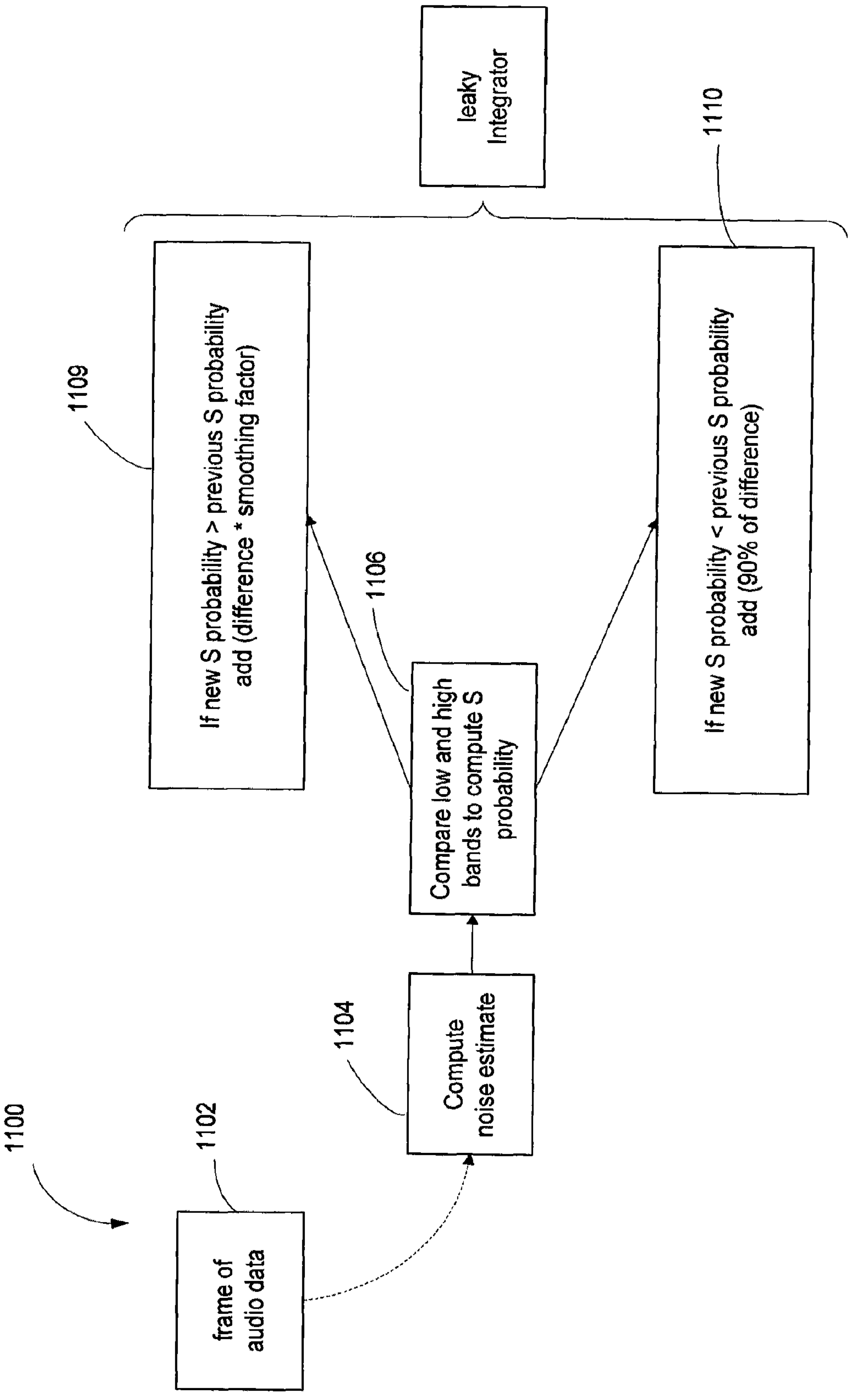
FIG. 11 is a partial block diagram of a consonant detector.

FIG. 11 is a diagram of a consonant detector 1100 that may be linked to or may be a unitary part of an end-pointing system. A receiver or microphone captures the sound waves during voice activity. A Fast Fourier Transform (FFT) element or logic converts the time-domain signal into a frequency domain signal that is broken into frames 1102. A filter or noise estimate logic predicts the noise spectrum in each of a plurality of low frequency bands 1104. The energy in each noise estimate is compared to the energy in the high frequency band of interest through a comparator that predicts the likelihood of an /s/ (or unvoiced speech sound such as /f/, /th/, /h/, etc., or in an alternate system, a plosive such as /p/, /t/, /k/, etc.) in a selected band 1106. If a current probability within a frequency band varies from the previous probability, one or more leaky integrators and/or logic may modify the current probability. If the current probability exceeds a previous probability, the current probability is adapted by the addition of a smoothed difference (e.g., a difference times a smoothing factor) between the current and previous probabilities thorough an adder and multiplier 1109. If a current probability is less than the previous probability a percentage difference of the current and previous probabilities is added to the current probability by an adder and multiplier 1110. While a smoothing factor and percentage may be controlled and/or programmed with each application of the consonant detector; in some systems, the smoothing factor is much smaller than the applied percentage. The smoothing factor may comprise an average difference in percent across an "n" number of audio frames. "n" may comprise one, two, three or more integer frames of audio data.

Figure 12:
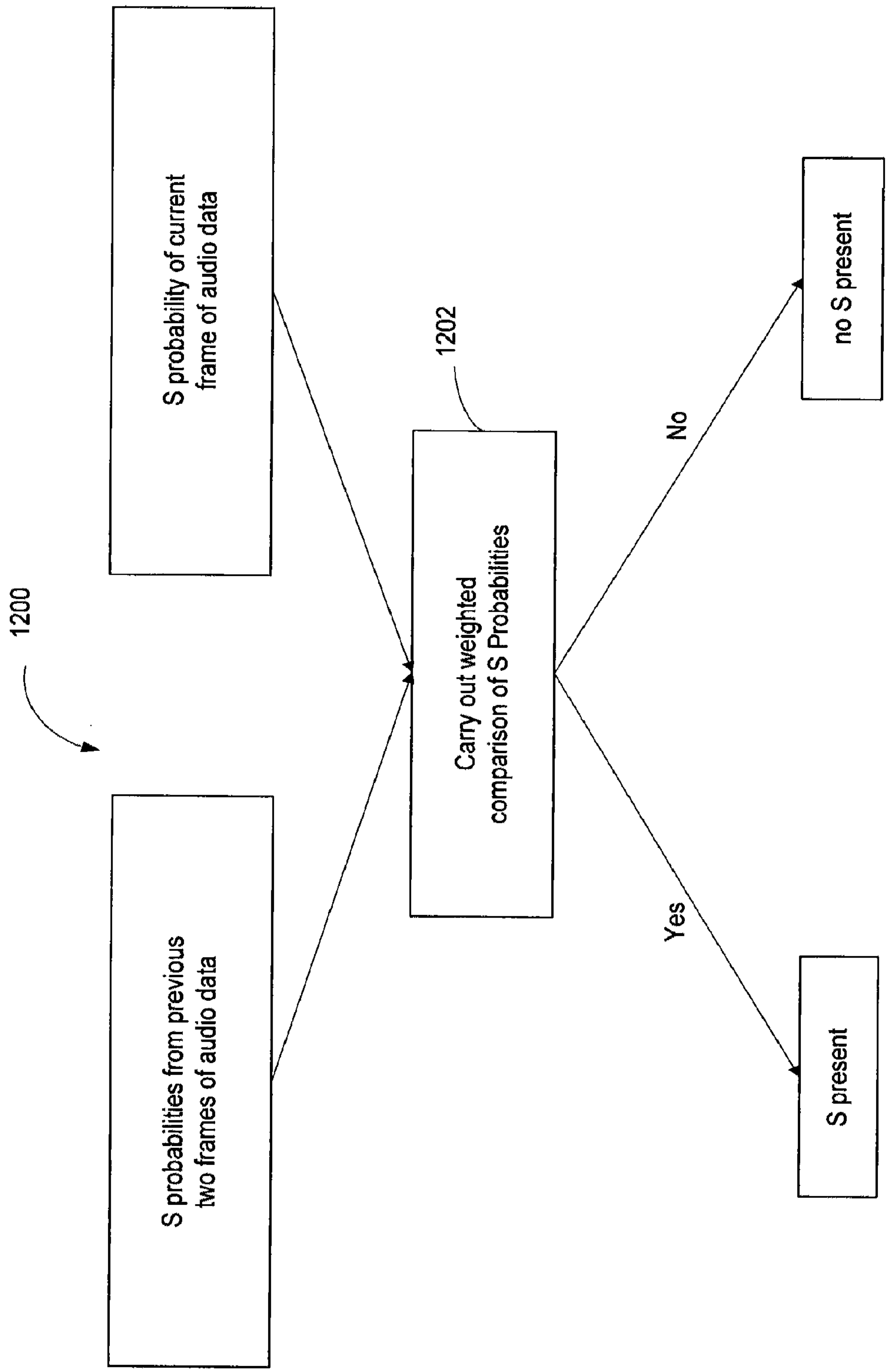
FIG. 12 is a partial block diagram of a consonant detector.

FIG. 12 is a partial diagram of the consonant detector 1200. The average probability of two, three, or more (e.g., "n" integer) audio frames is compared to the current probability of an audio frame through a weighted comparator 1202. If the ratio of consecutive ratios (e.g., $\%\text{frame}_{n-2}/\%\text{frame}_{n-1}$; $\%\text{frame}_{n-1}/\%\text{frame}_{n}$) has an increasing trend, an /s/ (or other unvoiced sound or plosive) is detected. If the ratio of consecutive ratios shows a decreasing trend an end-point of the speech interval may be declared.

Figure 13:
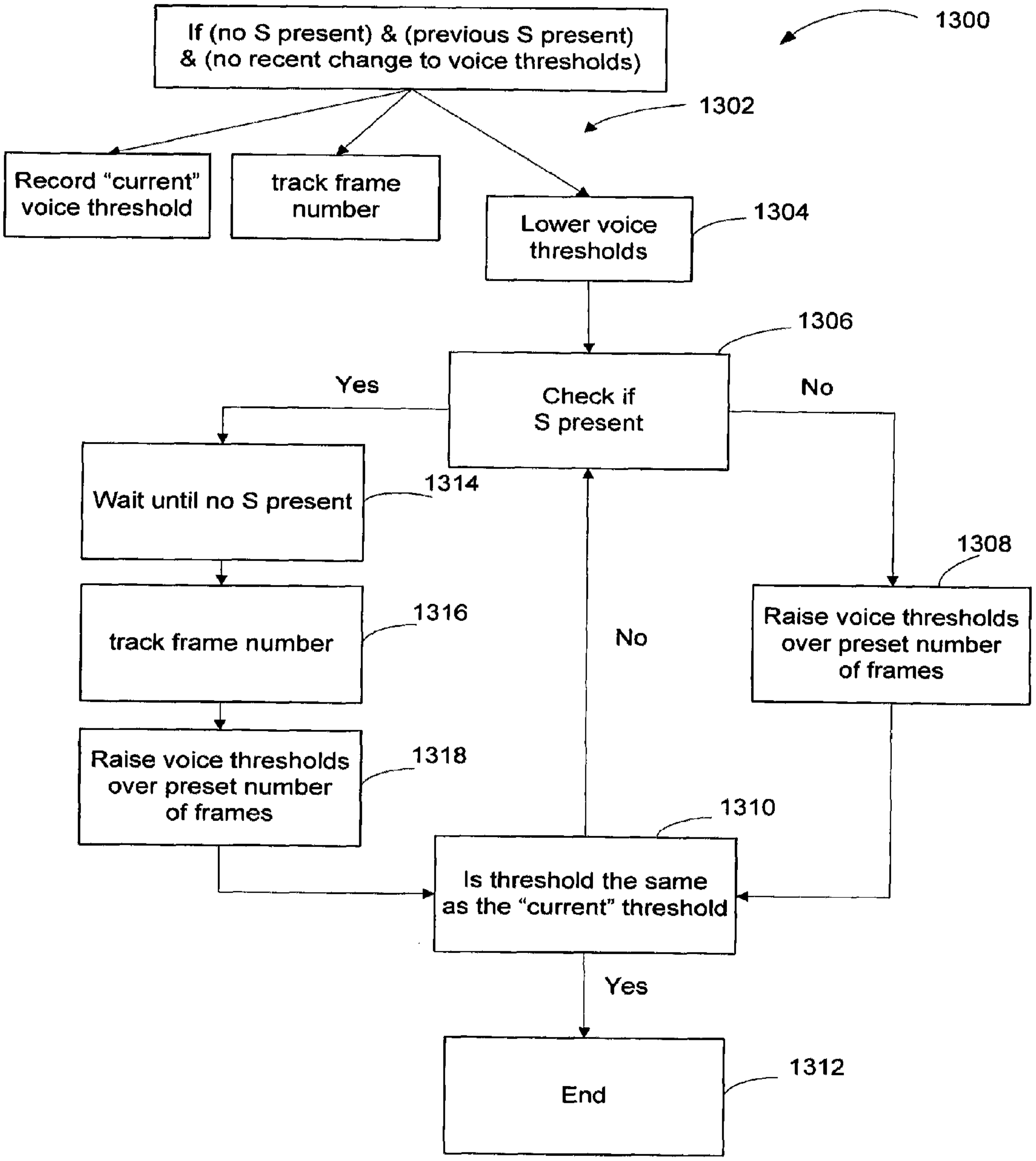
FIG. 13 is a process that adjusts voice thresholds.

One process that may adjust the voice thresholds may be based on the detection of unvoiced speech, plosives, or a consonant such as an /s/. In FIG. 13, if an /s/ is not detected in a current or previous frame and the voice thresholds have not changed during a predetermined period, the current voice thresholds and frame numbers are written to a local and/or remote memory 1302 before the voice thresholds are programmed to a predetermined level 1304. Because voice sound may have a more prominent harmonic structure than unvoiced sound and plosives, the voice thresholds may be programmed to a lower level. In some processes the voice thresholds may be dropped within a range of approximately 49% to about 76% of the current voice threshold to make the comparison more sensitive to weak harmonic structures. If an /s/ (or another unvoiced sound or plosive) is detected 1306, the voice thresholds are increased across a programmed number of audio frames 1308 before it is compared to the current thresholds 1310 and written to the local and/or remote memory. If the increased threshold and current thresholds are the same, the process ends 1312. Otherwise, the process analyzes more frames. If an /s/ is detected 1306, the process enters a wait state 1314 until an /s/ is no longer detected. When an /s/ is no longer detected the process stores the current frame number 1316 in the local and/or the remote memory and raises the voice thresholds across a programmed number of audio frames 1318. When the raised threshold and current thresholds are the same 1310, the process ends 1312. Otherwise, the process analyzes another frame of audio data.

In some processes the programmed number of audio frames comprises the difference between the originally stored frame number and the current frame number. In an alternative process, the programmed frame number comprises the number of frames occurring within a predetermined time period (e.g., may be very short such as about 100 ms). In these processes the voice threshold is raised to the previously stored current voice threshold across that time period. In an alternative process, a counter tracks the number of frames processed. The alternative process raises the voice threshold across a count of successive frames.

Figure 14:
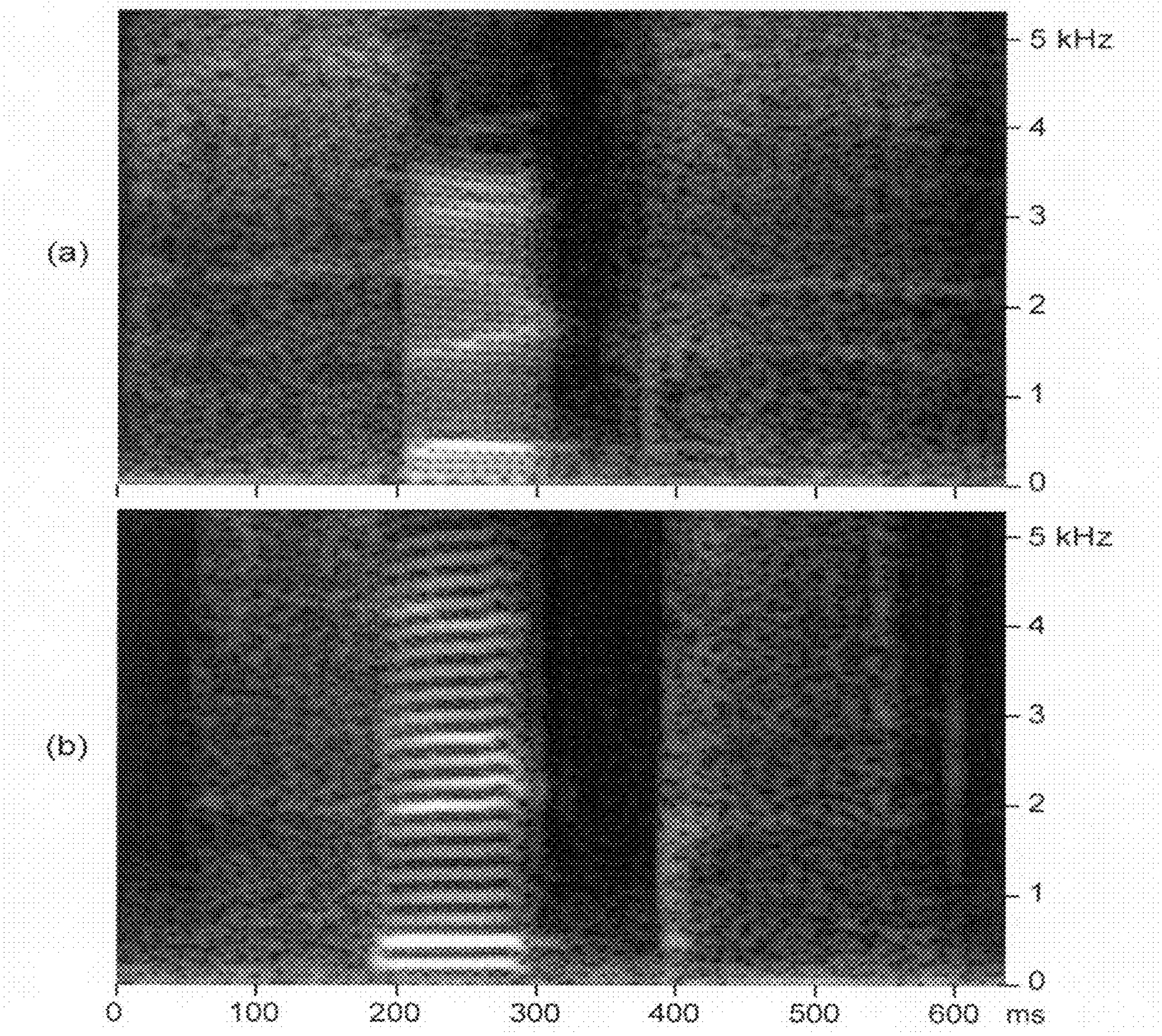
FIG. 14 are spectrograms of a voiced segment.
Figure 15:
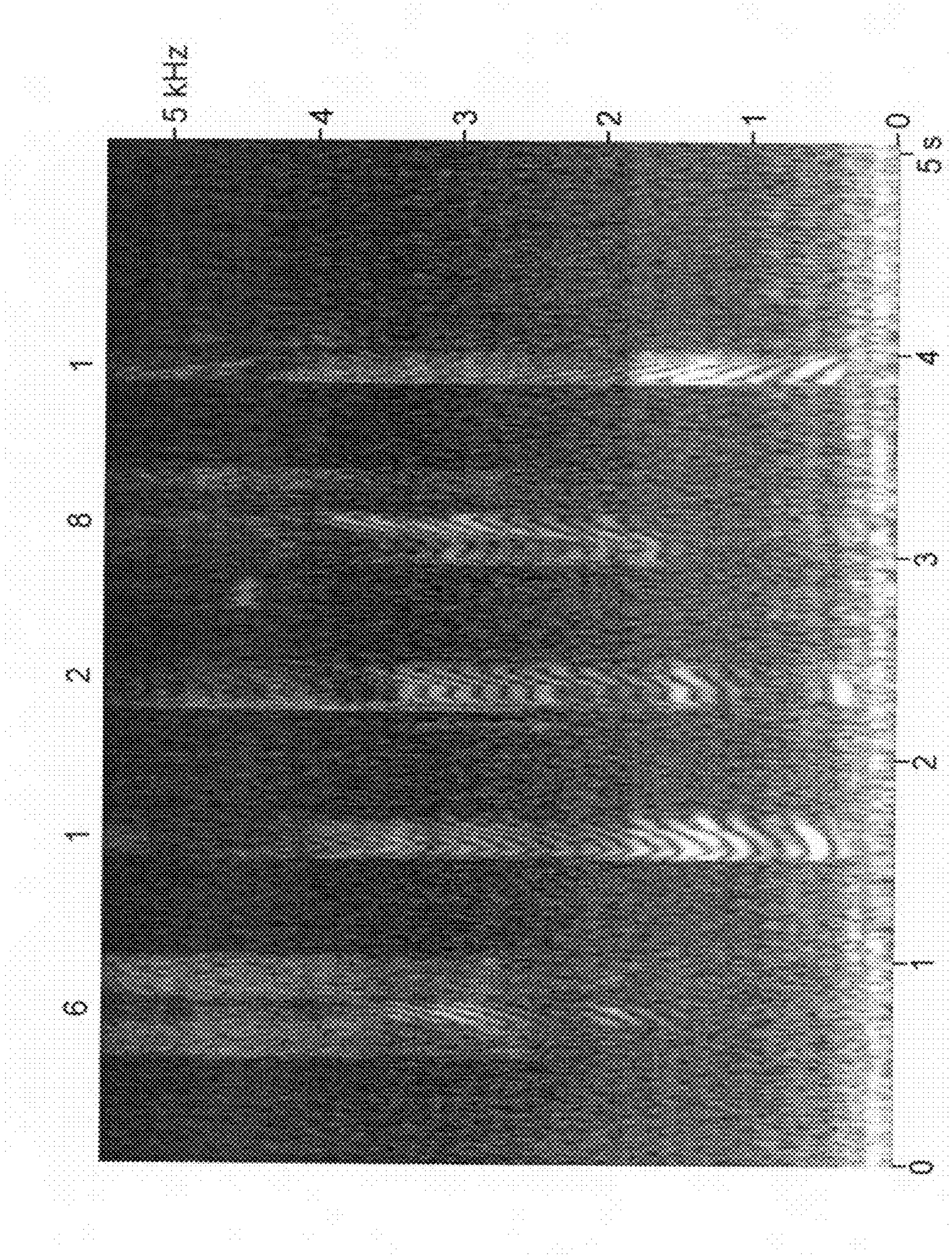
FIG. 15 is a spectrogram of a voiced segment.
Figure 16:
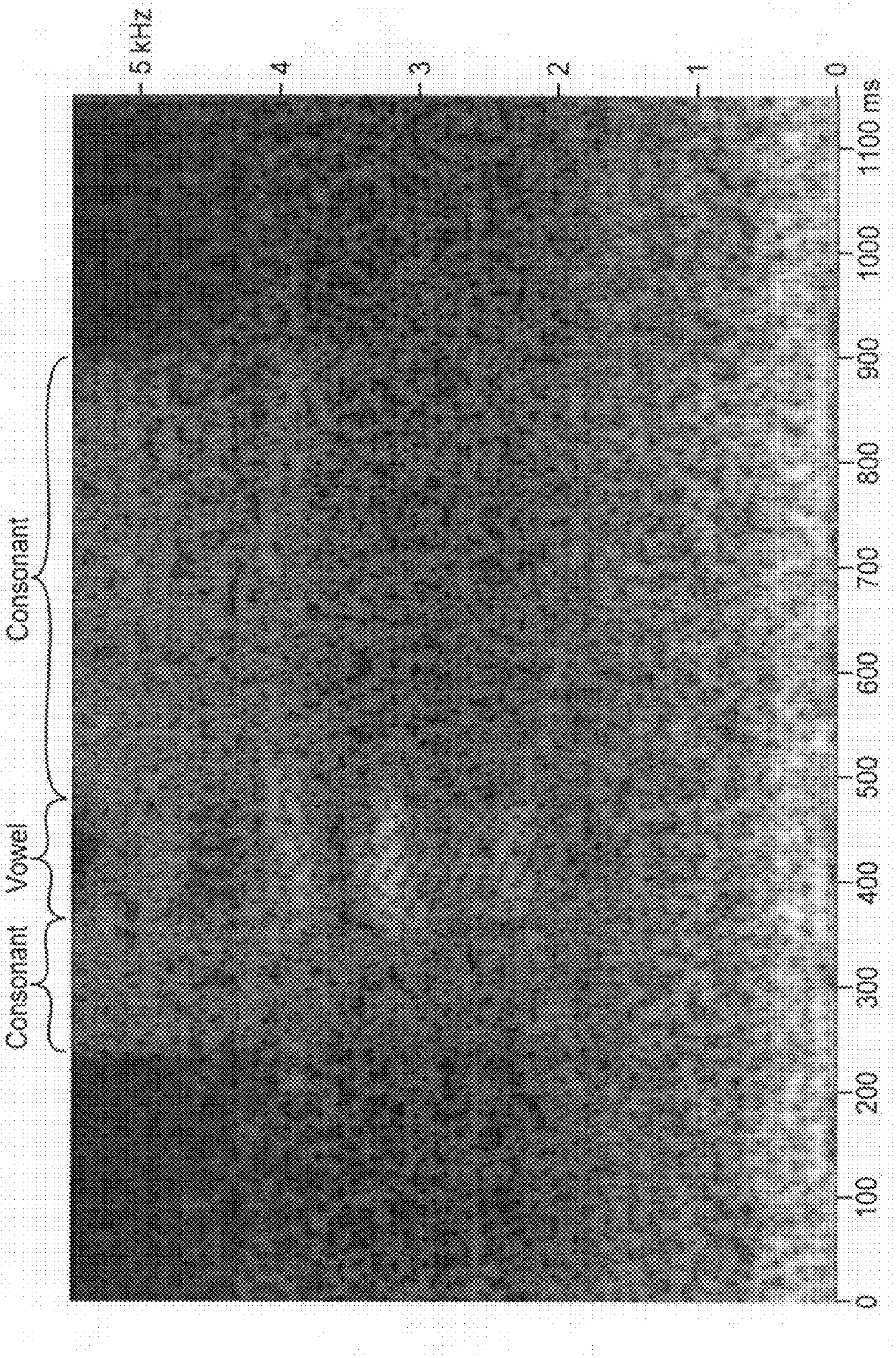
FIG. 16 is a spectrogram of a voiced segment.

FIG. 14 exemplifies spectrograms of a voiced segment spoken by a male (a) and a female (b). Both segments were spoken in a substantially noise free environment and show the short duration of a vowel preceded and followed by the longer duration of high frequency consonants. Note the strength of the low frequency harmonics in (a) in comparison to the harmonic structure in (b). FIG. 15 exemplifies a spectrogram of a voiced segment of the numbers 6, 1, 2, 8, and 1 spoken in French. The articulation of the number 6 includes a short duration vowel preceded and followed by longer duration high-frequency consonant. Note that there is substantially less energy contained in the harmonics of the number 6 than in the other digits. FIG. 16 exemplifies a magnified spectrogram of the number 6. In this figure the duration of the consonants are much longer than the vowel. Their approximate occurrence is annotated near the top of the figure. In FIG. 16 the consonant that follows the vowel is approximately 400 ms long.

Figure 17:
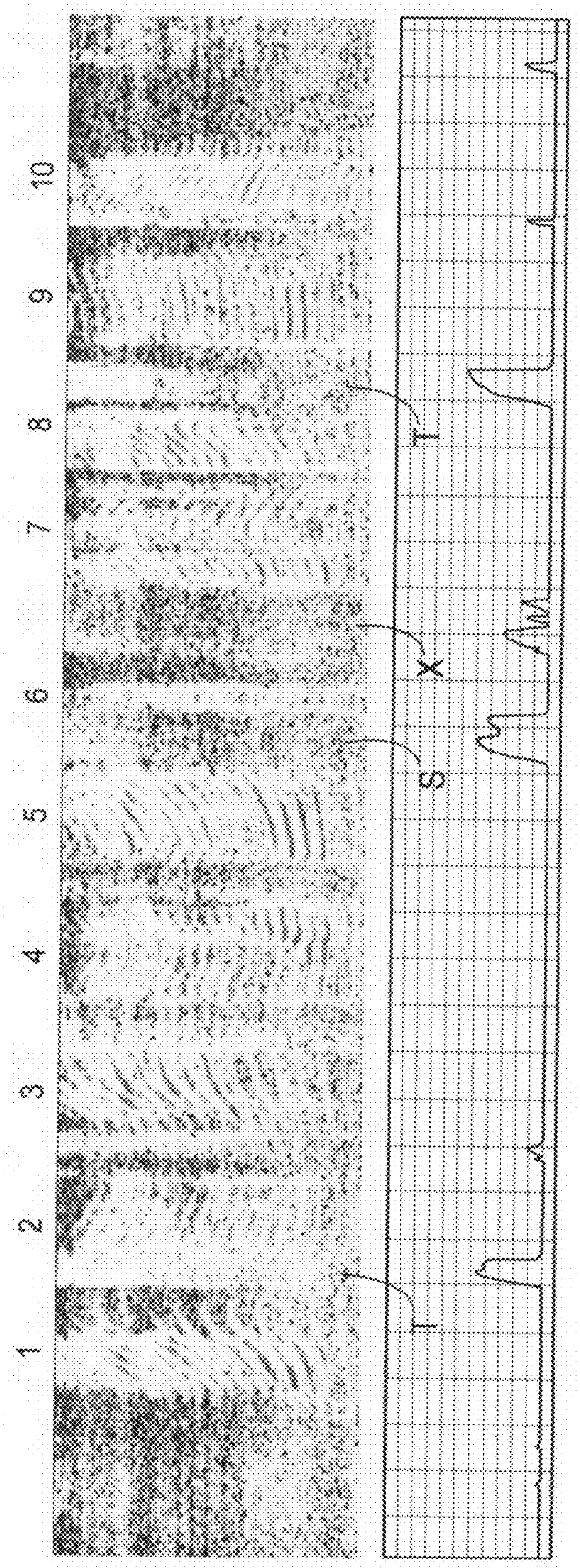
FIG. 17 are spectrograms of a voiced segment positioned above an output of a consonant detector.
Figure 18:
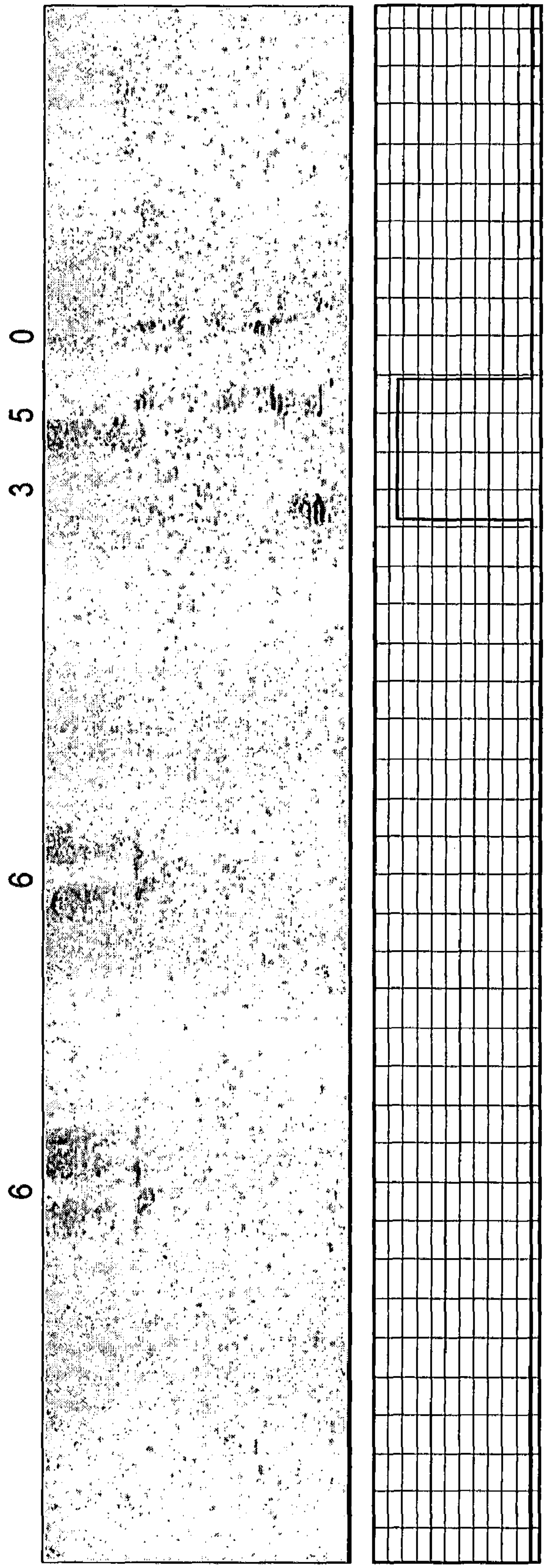
FIG. 18 are spectrograms of a voiced segment positioned above an end-point interval.
Figure 19:
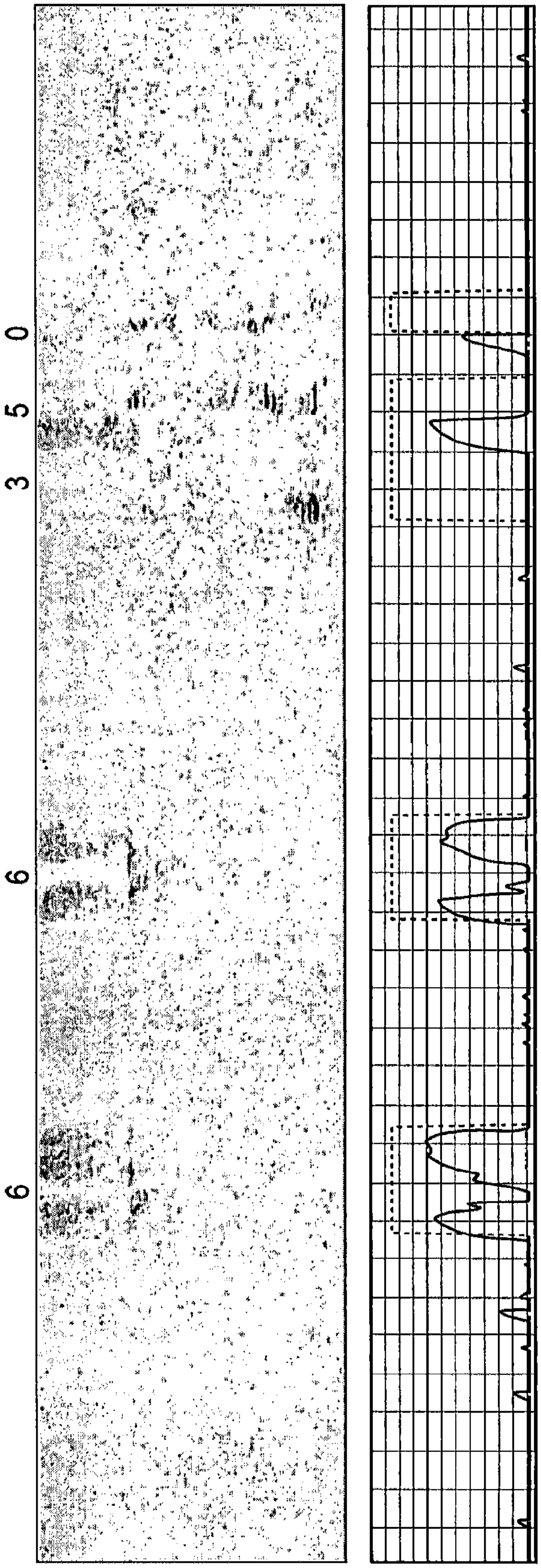
FIG. 19 are spectrograms of a voiced segment positioned above an end-point interval enclosing an output of the consonant detector.

FIG. 17 exemplifies spectrograms of a voiced segment positioned above an output of an /s/ (or consonant detector) detector. The /s/ detector may identify more than the occurrence of an /s/ Notice how other high-frequency consonants such as the /s/ and /x/ in the numbers 6 and 7 and the /t/ in the numbers 2 and 8 are detected and accurately located by the /s/ detector. FIG. 18 exemplifies spectrogram of a voiced segment positioned above an end-point interval without an /s/ or consonant detection. The voiced segment comprises a French string spoken in a high noise condition. Notice how only the number 2 and 5 are detected and correctly end-pointed while other digits are not identified. FIG. 19 exemplifies the same voice segment of FIG. 18 positioned above end-point intervals adjusted by the /s/ or consonant detection. In this case each of the digits is captured within the interval.

Figure 20:
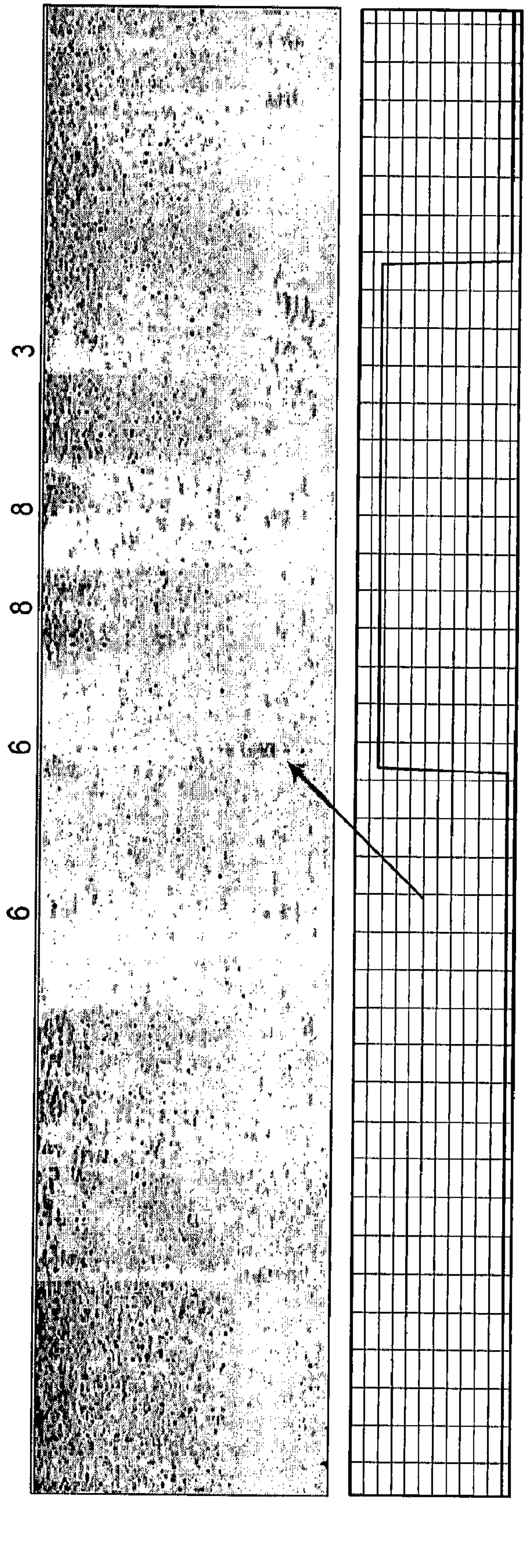
FIG. 20 are spectrograms of a voiced segment positioned above an end-point interval.
Figure 21:
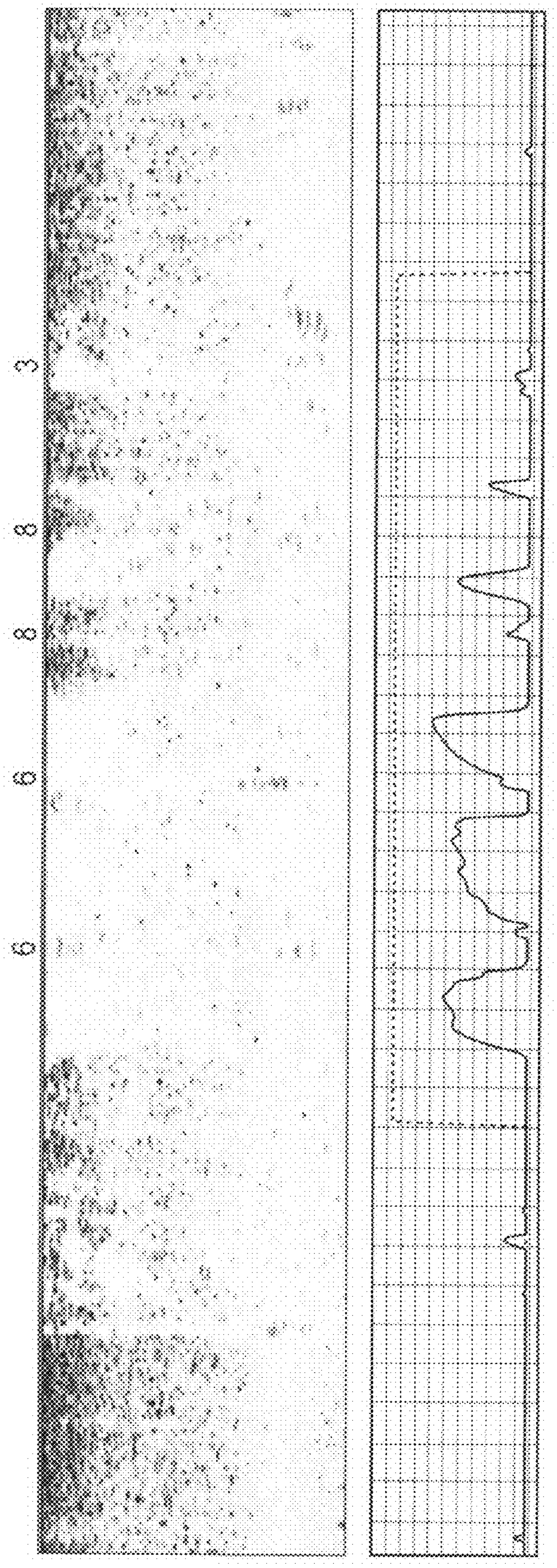
FIG. 21 are spectrograms of a voiced segment positioned above an end-point interval enclosing an output of the consonant detector.

FIG. 20 exemplifies spectrograms of a voiced segment positioned above an end-point interval without /s/ or consonant detection. In this example the significant energy in a vowel of the number 6 (highlighted by the arrow) trigger an end-point interval that captures the remaining sequence. If the six had less energy there is a probability that the entire segment would have been missed. FIG. 21 exemplifies the same voice segment of FIG. 20 positioned above end-point intervals adjusted by the /s/ or consonant detection. In this case each of the digits is captured within the interval.

The methods shown in FIGS. 3, 4, 10, 13, may be encoded in a signal bearing medium, a computer readable medium such as a memory, programmed within a device such as one or more integrated circuits, or processed by a controller or a computer. If the methods are performed by software, the software may reside in a memory partitioned with or interfaced to the rule module 108, voice analysis module 116, ASR engine 118, a controller, or other types of device interface. The memory may include an ordered listing of executable instructions for implementing logical functions. Logic may comprise hardware, software, or a combination. A logical function may be implemented through digital circuitry, through source code, through analog circuitry, or through an analog source such as through an electrical, audio, or video signal. The software may be embodied in any computer-readable or signal-bearing medium, for use by, or in connection with an instruction executable system, system, or device. Such a system may include a computer-based system, a processor-containing system, or another system that may selectively fetch instructions from an instruction executable system, system, or device that may also execute instructions.

A "computer-readable medium," "machine-readable medium," "propagated-signal" medium, and/or "signal-bearing medium" may comprise any means that contains, stores, communicates, propagates, or transports software for use by or in connection with an instruction executable system, system, or device. The machine-readable medium may selectively be, but not limited to, an electronic, magnetic, optical, electromagnetic, infrared, or semiconductor system, system, device, or propagation medium. A non-exhaustive list of examples of a machine-readable medium would include: an electrical connection "electronic" having one or more wires, a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic), or an optical fiber (optical). A machine-readable medium may also include a tangible medium upon which software is printed, as the software may be electronically stored as an image or in another format (e.g., through an optical scan), then compiled, and/or interpreted or otherwise processed. The processed medium may then be stored in a computer and/or machine memory.

While various embodiments of the inventions have been described, it will be apparent to those of ordinary skill in the art that many more embodiments and implementations are possible within the scope of the inventions. Accordingly, the inventions are not to be restricted except in light of the attached claims and their equivalents.

We claim:

1. An end-pointer that determines a beginning and an end of a speech segment comprising:

a voice triggering module that identifies a portion of an audio stream comprising an audio speech segment;

a rule module in communication with the voice triggering module, the rule module comprising a plurality of rules used by a processor to analyze a part of the audio stream to detect a beginning and an end of the audio speech segment; and a consonant detector that calculates a difference between a signal-to-noise ratio in a high frequency band and a signal-to-noise ratio in a low frequency band, where the consonant detector converts the difference between the signal-to-noise ratio in the high frequency band and the signal-to-noise ratio in the low frequency band into a probability value that predicts a likelihood of a high frequency consonant in the portion of the audio stream;

where the beginning of the audio speech segment and the end of the audio speech segment represent boundaries between speech and non-speech portions of the audio stream, and where the rule module identifies the beginning of the audio speech segment or the end of the audio speech segment based on an output of the consonant detector.

2. The end-pointer of claim 1, where the voice triggering module identifies a vowel.

3. The end-pointer of claim 1, where the consonant detector comprises an /s/ detector.

4. The end-pointer of claim 1, where the portion of the audio stream comprises a frame.

5. The end-pointer of claim 1, where the rule module analyzes an energy level in the portion of the audio stream.

6. The end-pointer of claim 1, where the rule module analyzes an elapsed time in the portion of the audio stream.

7. The end-pointer of claim 1, where the rule module analyzes a predetermined number of plosives in the portion of the audio stream.

8. The end-pointer of claim 1, where the rule module identifies the beginning of the audio speech segment or the end of the audio speech segment based on the probability value that predicts the likelihood of the high frequency consonant in the portion of the audio stream.

9. The end-pointer of claim 1, further comprising an energy detector.

10. The end-pointer of claim 1, further comprising a controller in communication with a memory, where the rule module resides within the memory.

11. The end-pointer of claim 1, where the probability value indicates a likelihood that a consonant exists in a frame of the audio stream, where the consonant detector compares the probability value to consonant likelihood values associated with previous frames and identifies a consonant based on detection of an increasing trend.

12. The end-pointer of claim 1, where the probability value indicates a likelihood that a consonant exists in a frame of the audio stream, where the consonant detector compares the probability value to consonant likelihood values associated with previous frames and sets an endpoint based on detection of a decreasing trend.

13. The end-pointer of claim 1, where the probability value comprises a current probability value associated with a current frame of the audio stream, where the consonant detector modifies the current probability value when the current probability value deviates from consonant probability values associated with previous frames.

14. The end-pointer of claim 13, where the consonant detector adds to the current probability value a temporally smoothed difference between the current probability value and a probability value associated with a previous frame, upon determination that the current probability value exceeds the probability value associated with the previous frame, where the consonant detector generates the temporally smoothed difference by multiplying a smoothing factor with the difference between the current probability value and the probability value associated with the previous frame;

where the consonant detector adds to the current probability value a portion of the difference between the current probability value and the probability value associated with the previous frame, upon determination that the current probability value is less than the probability value associated with the previous frame, where the consonant detector generates the portion of the difference by multiplying the difference by a percentage; and where the smoothing factor is different than the percentage.

15. The end-pointer of claim 1, where the consonant detector comprises a non-transitory computer-readable medium or circuit.

16. A method that identifies a beginning and an end of a speech segment using an end-pointer comprising:

receiving a portion of an audio stream;

determining whether the portion of the audio stream includes a triggering characteristic;

calculating a difference between a signal-to-noise ratio in a high frequency band of the portion of the audio stream and a signal-to-noise ratio in a low frequency band of the portion of the audio stream;

converting, by a consonant detector implemented in hardware or embodied in a computer-readable storage medium, the difference between the signal-to-noise ratio in the high frequency band and the signal-to-noise ratio in the low frequency band into a probability value that predicts a likelihood of a high frequency consonant in the portion of the audio stream; and applying a rule that passes only a portion of the audio stream to a device when the triggering characteristic identifies a beginning of a voiced segment and an end of a voiced segment;

where the identification of the end of the voiced segment is based on an output of the consonant detector, where the end of the voiced segment represents a boundary between speech and non-speech portions of the audio stream.

17. The method of claim 16, where the rule identifies the portion of the audio stream to be sent to the device.

18. The method of claim 16, where the rule is applied to a portion of the audio stream that does not include the triggering characteristic.

19. The method of claim 16, where the triggering characteristic comprises a vowel.

20. The method of claim 16, where the triggering characteristic comprises an /s/ or an /x/.

21. The method of claim 16, further comprising raising a voice threshold in response to a detection of a high frequency consonant.

22. The method of claim 21, where the voice threshold is raised across a plurality of audio frames.

23. The method of claim 16, where the rule module analyzes an energy in the portion of the audio stream.

24. The method of claim 16, where the rule module analyzes an elapsed time in the portion of the audio stream.

25. The method of claim 16, where the rule module analyzes a predetermined number of plosives in the portion of the audio stream.

26. The method of claim 16, further comprising marking the beginning and the end of a potential speech segment.

27. A system that identifies a beginning and an end of a speech segment comprising:

an end-pointer comprising a processor that analyzes a dynamic aspect of an audio stream to determine the beginning and the end of the speech segment; and a high frequency consonant detector that marks the end of the speech segment, where the high frequency consonant detector calculates a difference between a signal-to-noise ratio in a high frequency band of the audio stream and a signal-to-noise ratio in a low frequency band of the audio stream, and where the high frequency consonant detector converts the difference between the signal-to-noise ratio in the high frequency band and the signal-to-noise ratio in the low frequency band into a probability value that predicts a likelihood that a high frequency consonant exists in a frame of the audio stream;

where the beginning of the speech segment and the end of the speech segment represent boundaries between speech and non-speech portions of the audio stream, and where the end-pointer identifies the beginning of the audio speech segment or the end of the audio speech segment based on an output of the high frequency consonant detector.

28. The system of claim 27, where the dynamic aspect of the audio stream comprises a characteristic of a speaker.

29. The end system of claim 28, where the characteristic of the speaker comprises a rate of speech.

30. The system of claim 27, where the dynamic aspect of the audio stream comprises a level of background noise in the audio stream.

31. The system of claim 27, where the dynamic aspect of the audio stream comprises an expected sound in the audio stream.

32. The system of claim 31, where the expected sound comprises an expected answer to a question.

33. The system of claim 27, where the high frequency consonant detector comprises a non-transitory computer-readable medium or circuit.

34. A system that determines a beginning and an end of an audio speech segment in an audio stream, comprising:

an /s/ detector that converts a difference between a signal-to-noise ratio in a high frequency band of the audio stream and a signal-to-noise ratio in a low frequency band of the audio stream into a probability value that predicts a likelihood of an /s/ sound in the audio stream; and an end-pointer comprising a processor that varies an amount of an audio input sent to a recognition device based on a plurality of rules and an output of the /s/ detector;

where the end-pointer identifies a beginning of the audio input or an end of the audio input based on the output of the /s/ detector, and where the beginning of the audio input and the end of the audio input represent boundaries between speech and non-speech portions of the audio stream.

35. The end system of claim 34, where the recognition device comprises an automatic speech recognition device, and where the end-pointer adapts an endpoint of the audio input based on the output of the /s/ detector.

36. A non-transitory computer readable medium that stores software that determines at least one of a beginning and end of an audio speech segment comprising:

a detector that converts sound waves into operational signals;

a triggering logic that analyzes a periodicity of the operational signals;

a signal analysis logic that analyzes a variable portion of the sound waves that are associated with the audio speech segment to determine a beginning and end of the audio speech segment, and a consonant detector that calculates a difference between a signal-to-noise ratio in a high frequency band and a signal-to-noise ratio in a low frequency band, where the consonant detector converts the difference between the signal-to-noise ratio in the high frequency band and the signal-to-noise ratio in the low frequency band into a probability value that predicts a likelihood of an /s/ sound in the sound waves, where the consonant detector provides an input to the signal analysis logic when the /s/ is detected;

where the beginning of the audio speech segment and the end of the audio speech segment represent boundaries between speech and non-speech portions of the sound waves, and where the signal analysis module identifies the beginning of the audio speech segment or the end of the audio speech segment based on an output of the consonant detector.

37. The non-transitory computer readable medium of claim 36, where the signal analysis logic analyzes a time duration before a voiced speech sound.

38. The non-transitory computer readable medium of claim 36, where the signal analysis logic analyzes a time duration after a voiced speech sound.

39. The non-transitory computer readable medium of claim 36, where the signal analysis logic analyzes a number of transitions before or after a voiced speech sound.

40. The non-transitory computer readable medium of claim 36, where the signal analysis logic analyzes a duration of continuous silence before a voiced speech sound.

41. The non-transitory computer readable medium of claim 36, where the signal analysis logic analyzes a duration of continuous silence after a voiced speech sound.

42. The non-transitory computer readable medium of claim 36, where the signal analysis logic is coupled to a vehicle.

43. The non-transitory computer readable medium of claim 36, where the signal analysis logic is coupled to an audio system.

* * * * *